United States Patent [19]
Geise et al.

[11] Patent Number: 6,145,212
[45] Date of Patent: Nov. 14, 2000

[54] COMPONENT-SUPPORT FIXTURES FOR COMPONENT ASSEMBLY SYSTEM

[75] Inventors: Charles J. Geise, Indianapolis; Karl F. Cummings; William C. Tuttle, both of Columbus; Larry A. Couchman, North Vernon; Donald M. Searcy, Columbus; Donald G. Allen, Franklin, all of Ind.

[73] Assignee: ArvinMeritor, Inc., Troy, Mich.

[21] Appl. No.: 09/118,267

[22] Filed: Jul. 17, 1998

Related U.S. Application Data

[60] Provisional application No. 60/053,054, Jul. 18, 1997, and provisional application No. 60/053,745, Jul. 25, 1997.

[51] Int. Cl.[7] ................................................ G01B 5/20
[52] U.S. Cl. ............................ 33/549; 33/529; 33/600
[58] Field of Search ........................... 33/549, 1 G, 529, 33/533, 600, 613, 645, 551, 552, 573, 562, 567; 269/9, 37, 40, 55, 56, 57, 58, 59, 71

[56] References Cited

U.S. PATENT DOCUMENTS

| | | |
|---|---|---|
| 2,267,583 | 12/1941 | Carroll . |
| 2,541,535 | 2/1951 | Neff . |
| 2,909,351 | 10/1959 | Pratt . |
| 2,991,969 | 7/1961 | Hubbard . |
| 3,442,478 | 5/1969 | Parapetti . |
| 3,537,697 | 11/1970 | Davis ........................................ 269/50 |

(List continued on next page.)

OTHER PUBLICATIONS

Figs. 1–9 show stands used by Maremount Corporation, (date unknown).

Fig. 1 is a perspective view of multiple stands arranged to support an exhaust system, (date unknown).

Fig. 2 is a perspective view of two stands supporting exhaust pipes of an exhaust system, (date unknown).

Fig. 3 is a perspective view of a rotatable portion of a pipe stand including an attachment for holding an exhaust pipe, (date unknown).

Fig. 4 is a perspective view of a stand including an angular scale positioned next to the rotatable section and a height scale on which the rotatable section slides, (date unknown).

Fig. 5 is a side elevation view of the height scale of Fig. 4, (date unknown).

Fig. 6 is a side elevation view of another height scale similar to Fig. 5, (date unknown).

Fig. 7 is a perspective view showing three stands configured to support a muffler of an exhaust pipe connected to the muffler, (date unknown).

(List continued on next page.)

*Primary Examiner*—Christopher W. Fulton
*Attorney, Agent, or Firm*—Barnes & Thornburg

[57] ABSTRACT

A fixture for interacting with an exhaust system having exhaust pipes and mufflers and an image of the exhaust system, the image having location indicia locating the fixture on the image, displacement data associated with the location indicia indicates an alignment point in space above the image, the fixture comprising at least two stands adapted to lie in a selected positions relative to the image, an alignment mark on the stands, the alignment mark being adapted to align the stands with the location indicia on the image, and at least two modules, a plurality of holders configured differently from one another to be attached to a module, each holder defining a coordinate point that moves relative to the stand and image in response to movement of the module relative to the stand, the plurality of holders including at least one pipe holder configured to receive the exhaust pipe therein to position a central axis of the exhaust pipe at the coordinate point and a muffler holder configured to cooperate with another stand and another module to receive a muffler, and wherein the modules are configured to be coupled to the stand for movement relative to the stand to position the coordinate point of an attached holder at the alignment point in space above the image so that the module is moved to assume a selected position relative to the stand.

43 Claims, 29 Drawing Sheets

U.S. PATENT DOCUMENTS

| | | |
|---|---|---|
| 3,603,581 | 9/1971 | Christal .................................. 269/307 |
| 3,680,617 | 8/1972 | Schneider ................................ 144/288 |
| 3,774,270 | 11/1973 | Bentley ..................................... 24/276 |
| 3,960,232 | 6/1976 | Hubbell, III ......................... 180/64 A |
| 4,122,608 | 10/1978 | Hopf ......................................... 33/549 |
| 4,593,476 | 6/1986 | Clark et al. .............................. 33/529 |
| 4,660,797 | 4/1987 | Tonnies .................................. 248/610 |
| 5,195,607 | 3/1993 | Shimada et al. ....................... 180/296 |
| 5,197,698 | 3/1993 | Bartholomew ........................... 248/60 |
| 5,208,995 | 5/1993 | McKendrick ............................ 33/549 |
| 5,211,381 | 5/1993 | Shaw ....................................... 269/37 |
| 5,323,997 | 6/1994 | Danaj .................................. 248/354.7 |
| 5,388,318 | 2/1995 | Petta ........................................ 29/407 |
| 5,430,662 | 7/1995 | Ahonen .................................. 364/512 |
| 5,493,767 | 2/1996 | Susnjara ................................... 29/559 |
| 5,646,859 | 7/1997 | Petta et al. ......................... 364/468.01 |
| 5,829,151 | 11/1998 | Collier et al. ............................ 33/549 |
| 5,873,567 | 2/1999 | Williams ................................. 269/37 |
| 5,890,685 | 4/1999 | Takahashi ............................. 248/74.3 |

OTHER PUBLICATIONS

Fig. 8 is a perspective view showing two stands configured to hold the end of an exhaust system and a bracket attached to the exhaust system, (date unknown).

Fig. 9 is a perspective view showing a stand supporting an exhaust component, the stand including an angular scale, (date unknown).

Figs. 10–44 show stands used by Arvin Industries, Inc. (date unknown).

Fig. 10 is a perspective view of multiple stands arranged to receive a completed exhaust system, (date unknown).

Fig. 11 is a perspective view of two pipe stands posited adjacent to a muffler stand, (date unknown).

Fig. 12 is a perspective view of a pipe stand, (date unknown).

Fig. 13 is a perspective view of several stands including an end stand having a pipe attached thereto, a pipe stand, and a muffler stand, (date unknown).

Fig. 14 is a perspective view of a bracket stand showing a bracket positioned in the bracket stand, (date unknown).

Fig. 15 is another perspective view of the bracket stand of Fig. 14 with the bracket removed, (date unknown).

Fig. 16 is a top view of the bracket stand of Fig. 15 with the bracket removed, (date unknown).

Fig. 17 is a perspective view of the bracket stand of Fig. 15 rotated approximately 45°, (date unknown).

Fig. 18 is a top view of the bracket stand of Fig. 15 rotated approximately 90° from the view of Fig. 16, (date unknown).

Fig. 19 is a perspective view of another bracket stand, (date unknown).

Fig. 20 is a perspective view of a bracket stand, a muffler stand, and several pipe stands, (date unknown).

Fig. 21 is a perspective view of an original equipment manufacturer gauge showing pipe stands, bracket stands, an end stand, and a muffler stand, (date unknown).

Fig. 22 is a perspective view of an end stand, (date unknown).

Fig. 23 is another perspective view of the end stand of Fig. 22, (date unknown).

Fig. 24 is a perspective view of an end stand having a holder arm, (date unknown).

Fig. 25 is a perspective view of the end stand of Fig. 24, (date unknown).

Fig. 26 is a perspective view of the end stand of Figs. 24 showing holder arm rotated relative to the position the holder arm was in in Figs. 24 and 25, (date unknown).

Fig. 27 is a perspective view of the end stand of Fig. 26, (date unknown).

Fig. 28 is a perspective view of an end gauge, (date unknown).

Fig. 29 is a perspective view of the end gauge of Fig. 28, (date unknown).

Fig. 30 a perspective view of an end stand, a bracket stand, and a muffler stand, (date unknown).

Fig. 31 is a different perspective view of the slant–type end stand, bracket stand and muffler stand of Fig. 30, (date unknown).

Fig. 32 is a perspective view of a base of a stand, (date unknown).

Fig. 33 is a perspective view of three different gauges for three different prototype exhaust systems stored on three different levels of a rack, (date unknown).

Fig. 34 is a perspective view of a tailpipe gauge, (date unknown).

Fig. 35 is a perspective view of several gauges configured to hold brackets, pipes, and the ends of exhaust pipes, (date unknown).

Fig. 36 is another perspective view of the stands of Fig. 35, (date unknown).

Fig. 37 is a front elevational view of a bracket stand, (date unknown).

Fig. 38 is a side elevational view of the bracket stand of Fig. 37, (date unknown).

Fig. 39 is another perspective view of the bracket stand of Fig. 37, (date unknown).

Fig. 40 is a perspective view of a pipe stand lying on a drawing of an exhaust system, (date unknown).

Fig. 41 is a perspective view of a pipe stand, (date unknown).

Fig. 42 is a perspective view of a slant table used to form an end stand, (date unknown).

Fig. 43 is a perspective view of the slant table of Fig. 42 attached to a block and showing a plate attached to the slant table to form an end stand, (date unknown).

Fig. 44 is a perspective view of the end stand of Fig. 43, (date unknown).

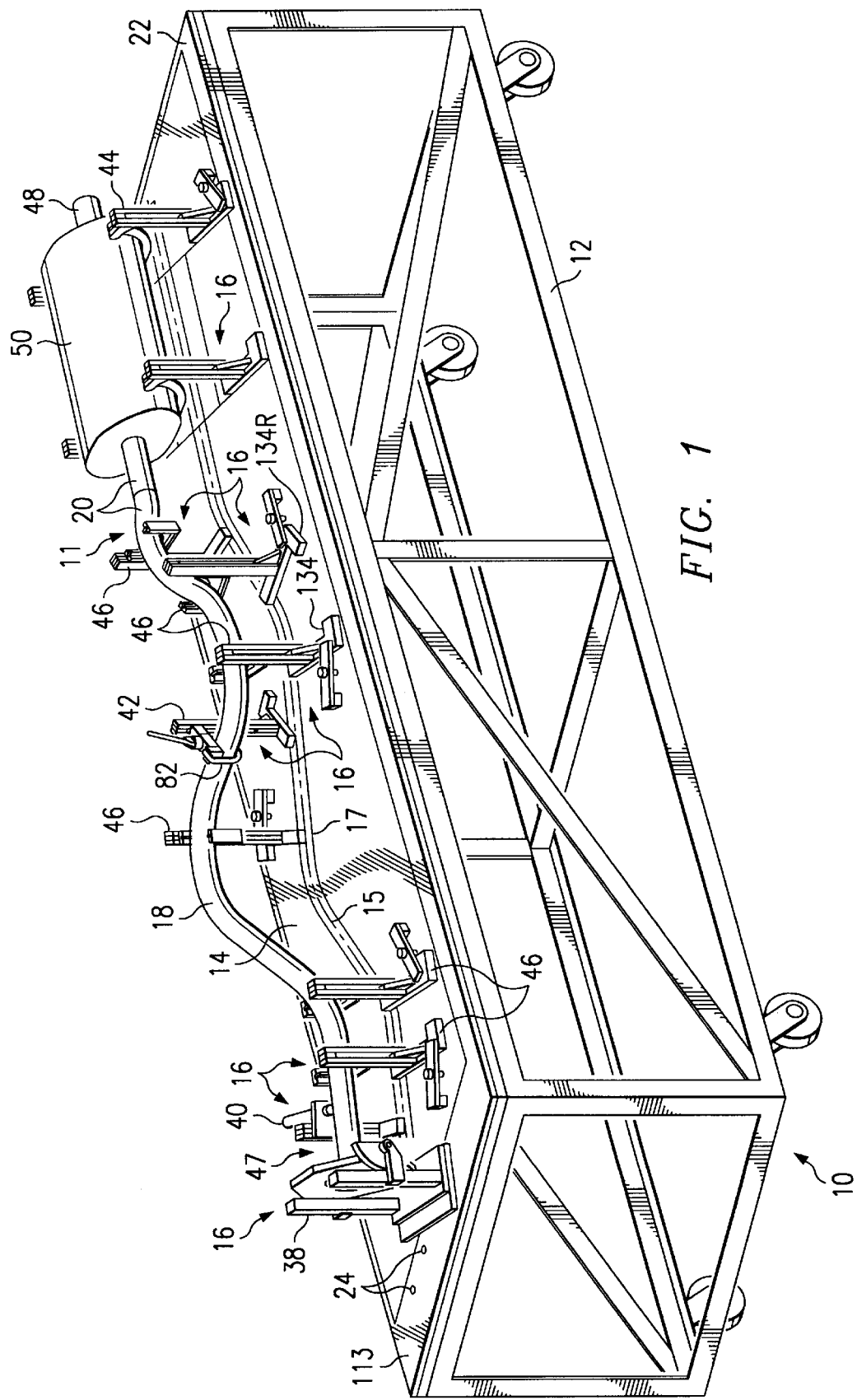

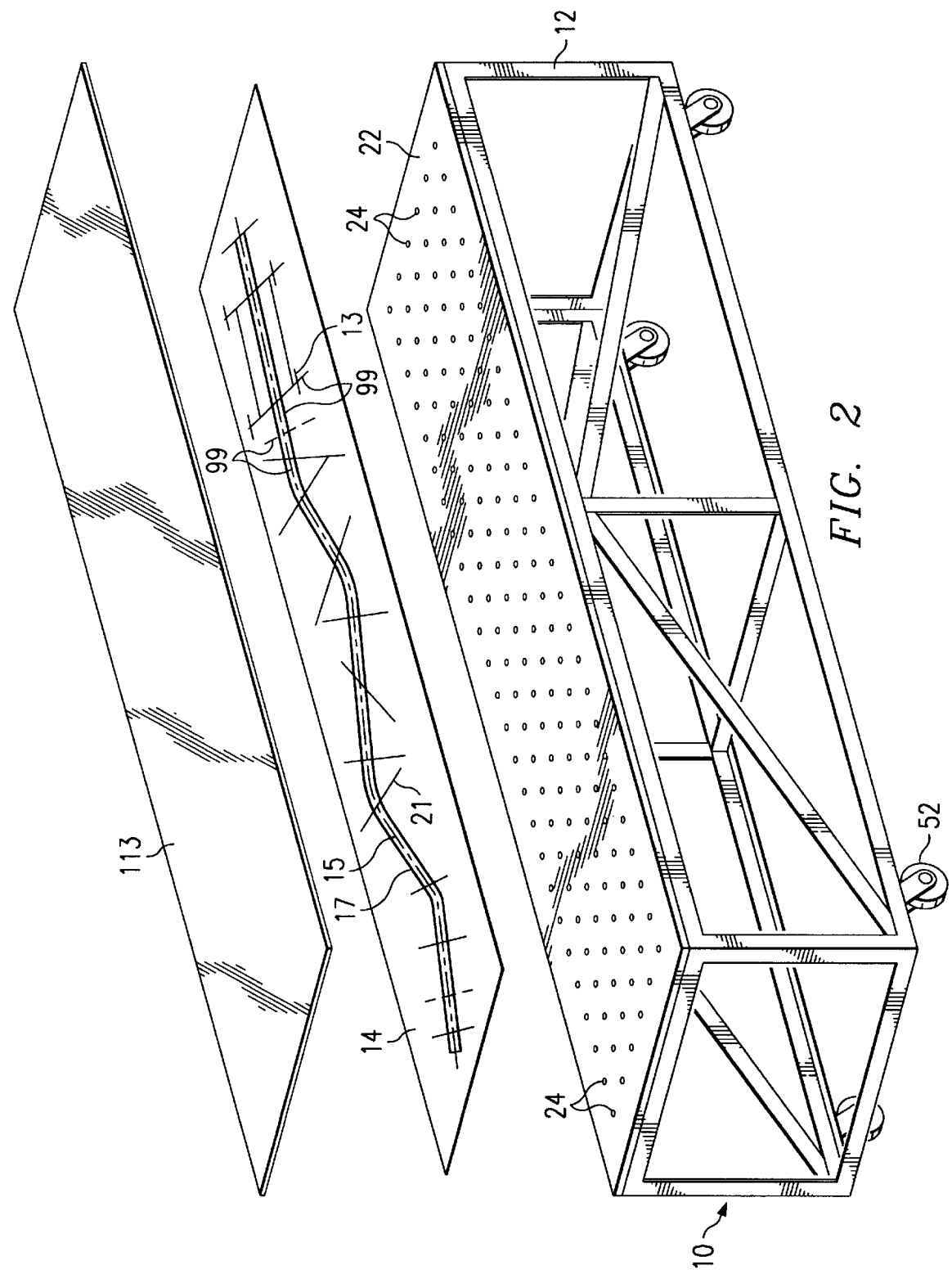

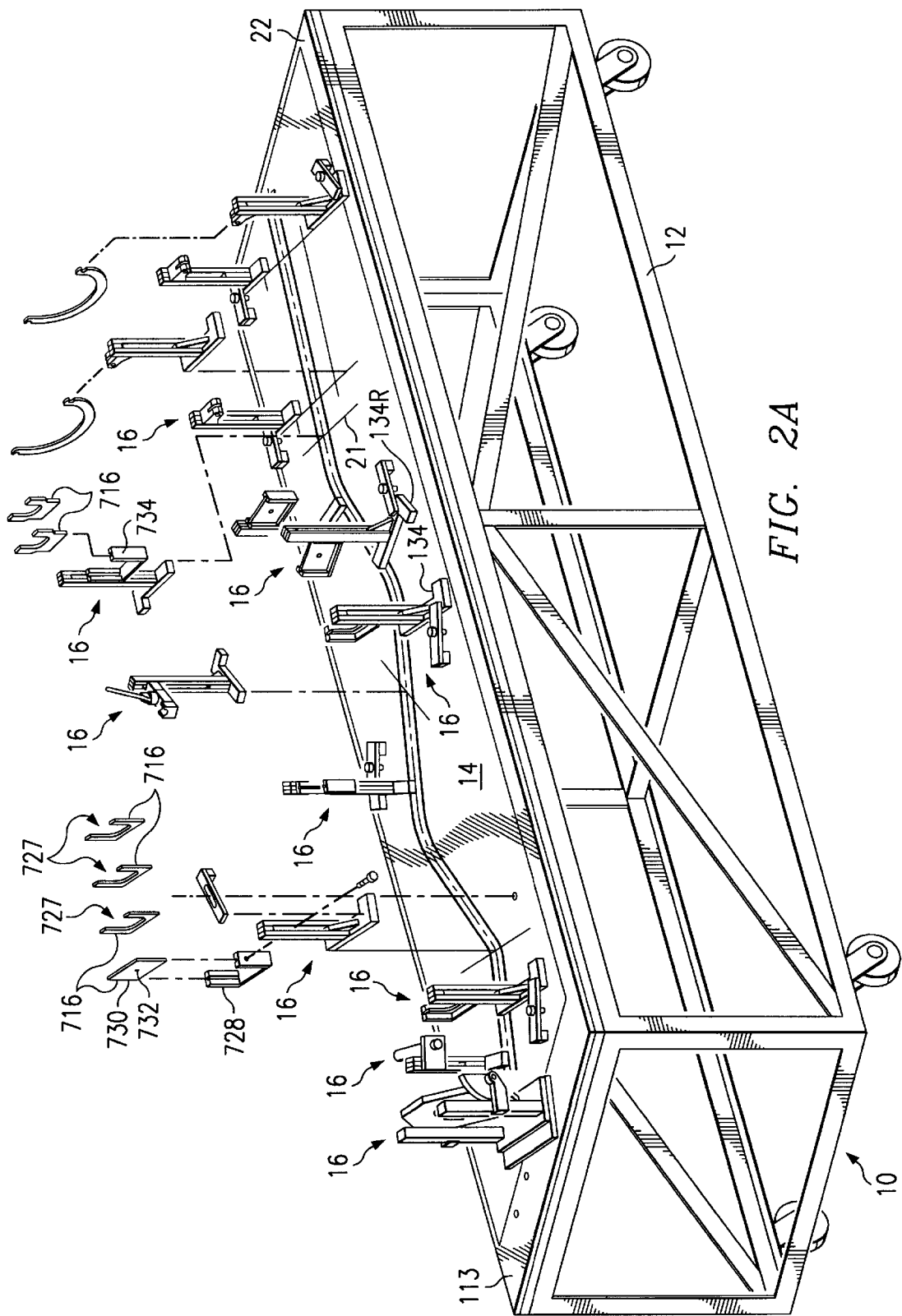

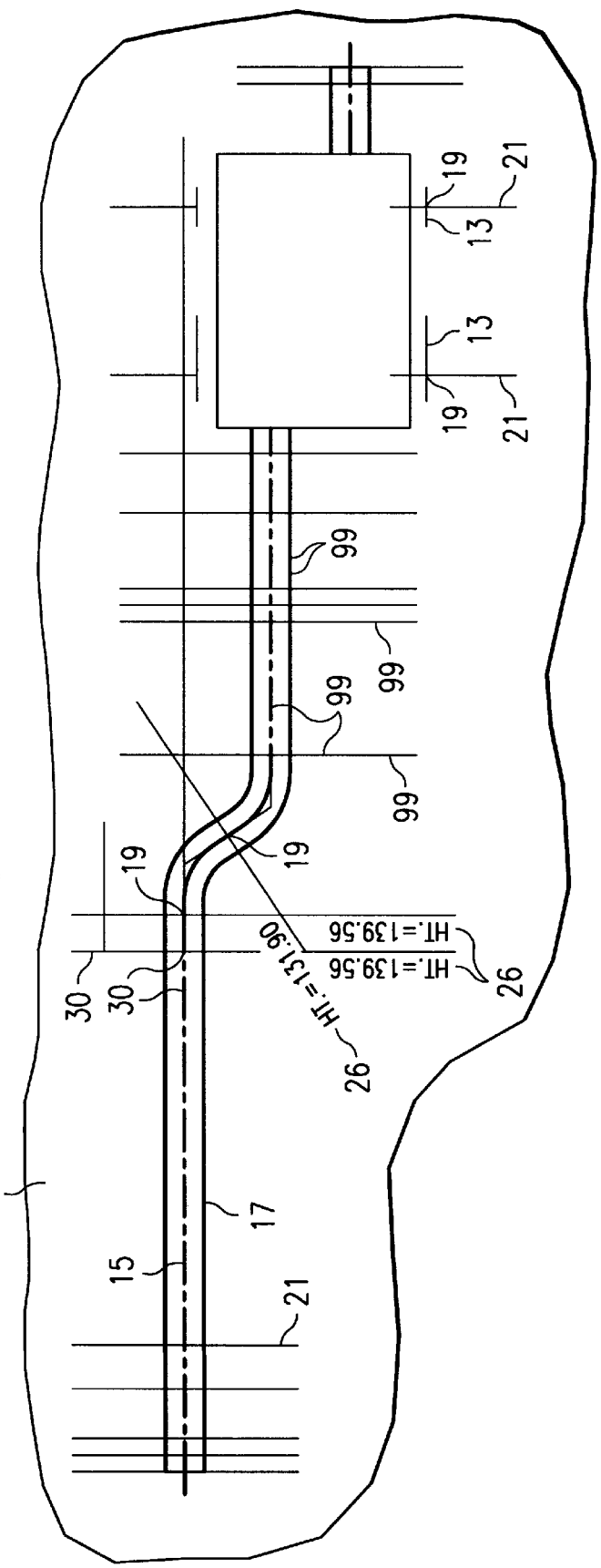

COMPONENT-SUPPORT FIXTURES FOR COMPONENT ASSEMBLY SYSTEM

This application claims the benefit of U.S. Provisional application Ser. Nos. 60/053,054 filed Jul. 18, 1997 and 60/053,745 filed Jul. 25, 1997.

BACKGROUND AND SUMMARY OF THE INVENTION

The present invention relates to fixtures for supporting components to facilitate assembly of the components to one another, and particularly to fixtures for supporting components on a work bench. More particularly, the present invention relates to fixtures for supporting components of a prototype vehicle exhaust system during assembly of the system.

When creating prototype vehicle exhaust systems, it is common practice to design fixtures and gauges which can be used to ensure that the components of the prototype exhaust system meet design specifications. Exhaust systems typically wind their way between, through, and around other automotive components of the vehicles to which they are attached.

Not only must exhaust components wind around, between, and through various automobile components, but the exhaust components must also be suspended from the vehicle so as to avoid contact with the other automobile components during normal use. To accomplish this goal, exhaust systems must contain bends in specific locations. Individual components of the exhaust system must meet engineering tolerances as to length of the components and location of a longitudinal axis of the component. To ensure that the completed exhaust system will fit onto the vehicle that it is designed to be used upon without contacting other automotive components, the exhaust components must be manufactured within certain specifications and coupled to each other in the proper orientation.

According to the present invention, a fixture is provided for interacting with an exhaust system. The fixture includes a stand placed at a specified location and a module placed at a specified location relative to the stand.

In preferred embodiments, the fixture interacts with an image of the exhaust system displayed on a working surface. The image includes location indicia locating the fixture on the image. Displacement data associated with the location indicia is provided to indicate an alignment point in space above the image. The stand of the fixture includes an alignment mark. The stand is adapted to lie on the working surface in a selected position relative to the image. The alignment mark is adapted to align the stand with the location indicia on the image. The module of the fixture defines a coordinate point that moves relative to the stand and drawing in response to movement of the module relative to the stand. The module is coupled to the stand for movement relative to the stand to position the coordinate point of the module at the alignment point in space above the image so that the module is moved to assume a selected position relative to the stand.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the following figures in which:

FIG. 1 is a perspective view showing components in a prototype vehicle exhaust system held in a plurality of component-support fixtures that are attached to a full size projection drawing of the vehicle exhaust system that has been laid on the top of a wheeled table and covered by a plastic sheet, the fixtures including pipe fixtures, a sensor fixture, a muffler fixture, a bracket fixture, and an end fixture;

FIG. 2 is an exploded perspective view of the wheeled table, drawing, and clear plastic sheet illustrated in FIG. 1;

FIG. 2A is a partially exploded perspective view similar to FIGS. 1 and 2 showing the drawing having location lines used to align the component-support fixtures on the table with the underlying drawing and plastic sheet;

FIG. 3 is a plan view of a two dimensional projection drawing of an exhaust system which may be substituted for the drawing shown in FIGS. 1, 2, and 2A if a different exhaust system is being built, the drawing having location indicia and displacement data associated with the location indicia;

DETAILED DESCRIPTION OF THE DRAWINGS

Figure 4:
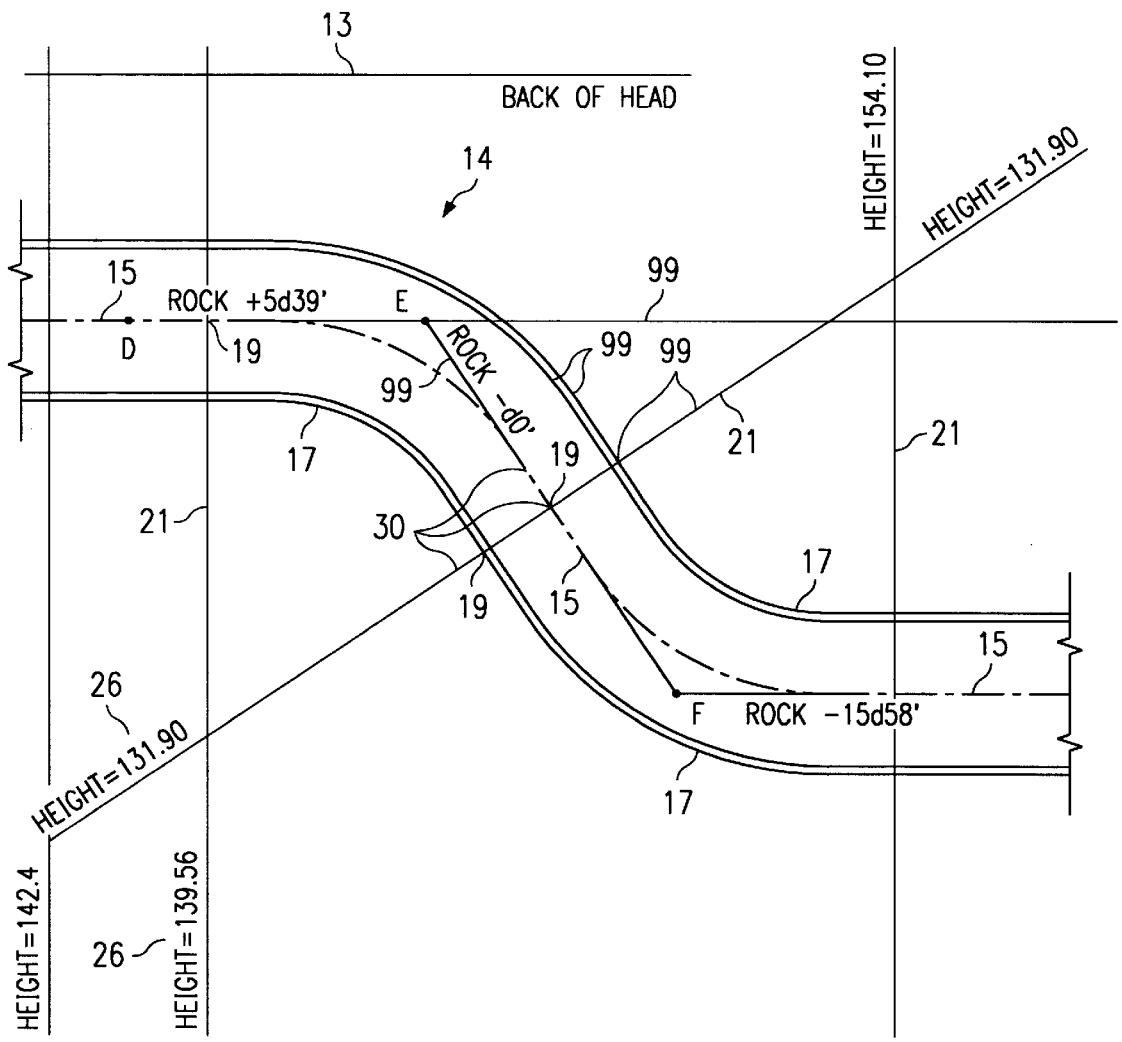
FIG. 4 is an enlarged plan view of a portion of the drawing of FIG. 3 showing the drawing including alignment lines, a projected tolerance outline of the exhaust system, extended projected centerlines of the exhaust system, and displacement data regarding the position of the exhaust system relative to the drawing.

Component-support fixtures 16 are provided for use on a table or work bench 10 to support components such as components of a prototype vehicle exhaust system 11 while the components are being assembled. Table 10 includes a wheeled frame 12 having a substantially flat working surface 22. Fixtures 16 are adjustable for supporting the components included in many different exhaust system 11 configurations as well as other component system configurations.

In the illustrated embodiment, the fixtures 16 are adjusted for a particular exhaust system 11 to conform to an engineering drawing 14 of the assembled exhaust system 11. Drawing 14 is mounted on surface 22 of table 10, and a plastic sheet 13 is placed over plotted drawing 14 as shown in FIG. 2. Drawing 14 is a two-dimensional plotted representation of a three-dimensional exhaust system 11 as shown in FIGS. 1, 2A, 3, and 4. In the illustrated embodiment, plotted drawing 14 is an actual size projection of an exhaust system 11. Drawing 14 includes indicia or indicators 99 including a projected tolerance outline 17 of exhaust system 11 including a multi-component vehicle exhaust pipe 18 and a projected centerline 15 of exhaust pipe 18 as shown, for example, in FIGS. 3 and 4.

While mounting of a drawing 14 of an exhaust system 11 onto a surface 22 on a table 10 has been described, it is understood that an image of the exhaust system 11 may be displayed on the working surface 22 in any manner. For example, the image may be projected onto the surface 22, through the surface 22, or even adjacent to the surface 22.

The indicia 99 of plotted drawing 14 also includes stand location indicia 30 having alignment indicators 32 for aligning each fixture 16 on table 10. Alignment indicators 32 include an alignment line 21 that may intersect with centerline 15 as shown in FIGS. 3 and 4. Thus, plotted drawing 14 includes a point or crosshair 19 formed by centerline 15 and alignment line 21 which is used to align each mounting fixture 16. Projected tolerance outline 17 of exhaust pipe 18 indicates the permissible tolerance allowed in the exhaust system 11. Plastic sheet 113 (FIG. 1) is clear and is used to protect plotted drawing 14. In alternative embodiments, any number or type of indicia may be added to the drawing.

The indicia of plotted drawing 14 further includes displacement data 26 that specifies how a particular fixture 16 should be adjusted relative to table 10. The fixture 16 is adjusted to hold a specific point or location of exhaust system 11 at an alignment point in space above the drawing 14 as specified by displacement data 26. In alternative embodiments, the displacement data is provided on a separate sheet and not on the drawing.

A plotted drawing 14 with a unique series of indicators 99 is created for each unique exhaust pipe 18 and unique exhaust system 11. After placing a unique plotted drawing 14 for a particular exhaust system 11 on table 10, a user can align and assemble exhaust system 11 using fixtures 16 as shown, for example, in FIGS. 1 and 2A. The indicators 99 include the location that the mounting fixtures 16 attach to table 10 and the position in which the fixture 16 supports the exhaust system 11 relative to the table 10.

Fixtures 16 can perform several functions including: (1) determining if the exhaust system 11 is within tolerance and in the proper alignment and (2) supporting the exhaust system 11 while components 20 of the exhaust system 11 are coupled together. A process using the disclosed fixtures 16 is disclosed in a United States Patent Application entitled "Process for Assembling Components to Produce a Vehicle Engine Exhaust System" filed concurrently herewith on Jul. 17, 1998 and incorporated herein by reference.

Flat working surface 22 of table 10 is formed to include a plurality of holes 24 spaced equidistant from each other as shown in FIG. 2. Each fixture 16 is coupled to table 10 by use of tie-down clamps 98 as shown, for example, in FIGS. 1 and 2A. Each tie-down clamp 98 includes a slot 110 as shown in FIGS. 1 and 2A. Bolts or stand couplers 112 are positioned to lie in slot 110 and one of plurality of holes 24 formed in flat surface 22. To couple fixtures 16 to flat surface 22, a user loosely bolts tie-down clamp 98 to a hole 24 of flat surface 22. The stand coupler 112 is anchored to table 10 by punching or otherwise inserting stand coupler 112 through drawing 14 and plastic sheet 113. Next, a user aligns base 34 of fixture 16 with alignment indicators 32 of plotted drawing 14.

After aligning base 34 with alignment indicators 32, a user tightens bolt 112 to flat surface 22 to secure fixture 16 to flat surface 22. Fixtures 16 can be bolted to flat surface 22 with any number of tie-down clamps 98. In alternative embodiments, the fixtures can be anchored to the table in any manner.

Each fixture 16 includes a stand 33 having a upright or column member 54, a base 34, and an alignment or location mark 36. Base 34 has a bottom surface 56, a top surface 58, a front wall 60, a rear wall 62, and a longitudinal axis 64. Alignment mark 36 includes any mark, edge, side, or other indicia that may be used to align fixture 16 relative to drawing 14. In the illustrated embodiment of FIG. 33, alignment mark 36 includes a front location mark or alignment mark 66 and a rear location mark or alignment mark 68. Front wall 60 and rear wall 62 are spaced apart by base length 70 and longitudinal axis 64 extends between front wall 60 and rear wall 62. Front alignment mark 66 is located on front wall 60 at the intersection of the front wall 60 with the longitudinal axis 64 and rear alignment mark 66 is located on the rear wall 62 at the intersection of the rear wall 62 with the longitudinal axis 64.

After fixing plotted drawing 14 to flat surface 22 of table 10, alignment indicators 32 of plotted drawing 14 are used to position fixture 14 on surface 22 by matching alignment marks 36 of base 34 with alignment indicators 32 on plotted drawing 14. Thus, plotted drawing 14 includes predetermined locations for each base 34 of fixtures 16 so that each fixture 16 is aligned to ensure proper support and positioning of exhaust system 11.

As shown in FIG. 1, fixtures 16 include pipe fixture 46, sensor fixture 40, muffler fixture 44, bracket fixture 42, and end fixture 38. Fixtures 16 support and/or align various components 20 of exhaust system 11. Exhaust system 11 includes several sections of exhaust pipe 18, an exhaust pipe bracket 82 (shown in FIGS. 16–20), a muffler 50, an exhaust sensor bushing 72 (shown in FIGS. 10–12), and spaced-apart first and second ends 47, 48. In alternative embodiments, exhaust system may include any number and combination of exhaust pipes, exhaust pipe brackets, mufflers, exhaust sensor bushings, resonators, converters, decouplers, tubes, oxygen sensor fittings, shields, decorative tips, and other exhaust system components.

Pipe fixture 46 is configurable to check the alignment of exhaust pipe 18, determine the length of exhaust pipe 18, and/or support exhaust pipe 18. Sensor fixture 40 is used to support a sensor bushing 72 while the sensor bushing 72 is connected to exhaust system 11. The sensor bushing 72 accepts a sensor (not shown) that is installed in exhaust system 11 at a later time. Muffler fixture 44 supports muffler 50 during alignment of the exhaust system 11 and mounting of muffler 50 to another component of exhaust system 11. Bracket fixture 42 is used to support and align brackets 82 while brackets 82 are mounted to exhaust system 11. End fixture 38 is used to support first end 47 of exhaust system 11. Any number of end fixtures 38, sensor fixtures 40, bracket fixtures 42, muffler fixtures 44, and pipe fixtures 46 can be used with a particular exhaust system 11.

Pipe fixture 46, sensor fixture 40, muffler fixture 44, and bracket fixture 42 include a multi-purpose stand 133, an exhaust component module 130, and a shoulder bolt or coupler 150 coupling the multi-purpose stand 133 to exhaust component module 130.

Figure 5:
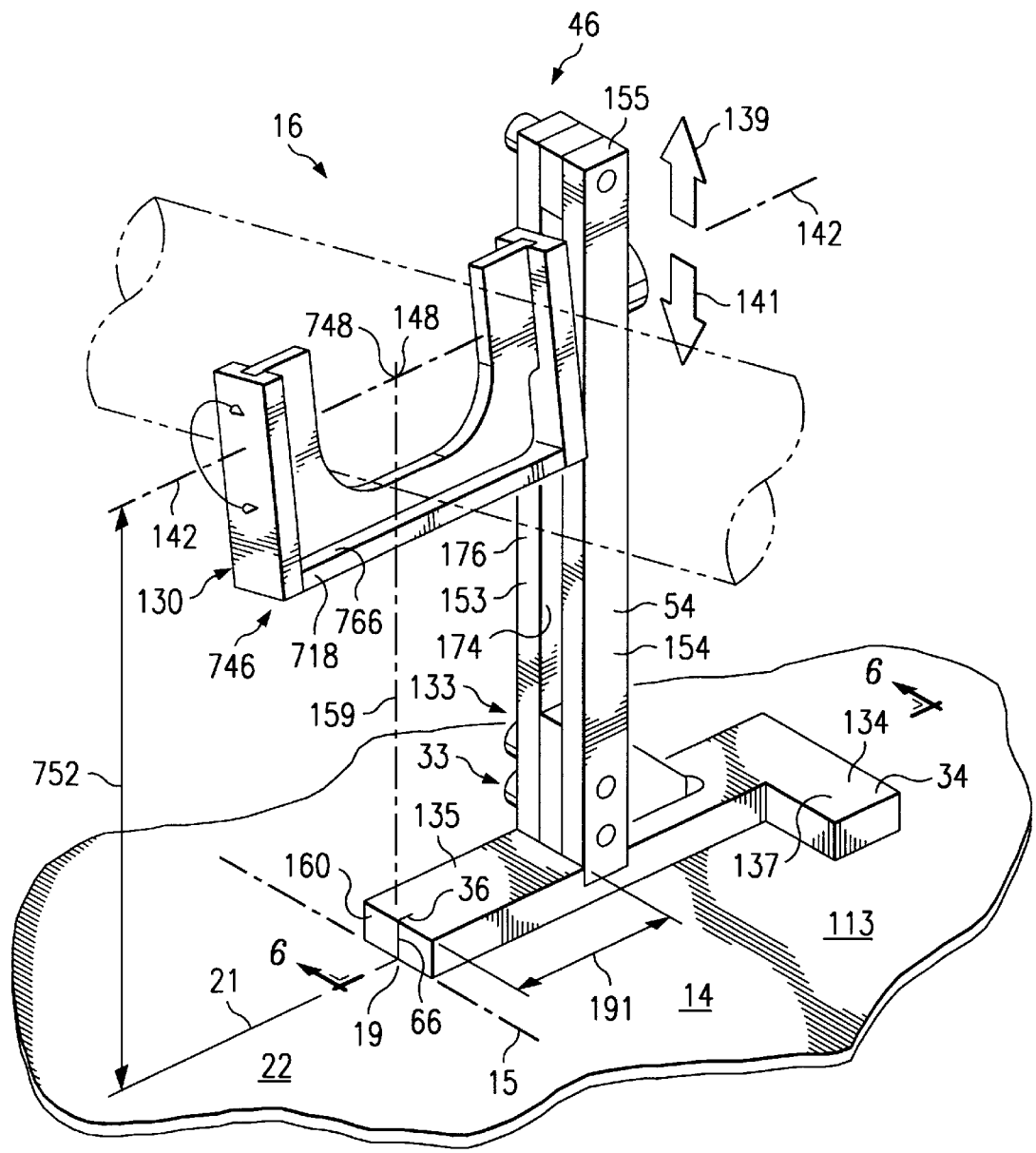
FIG. 5 is a perspective view of a pipe fixture including a multi-purpose stand, a single insert pipe stand module, and a shoulder bolt attaching the multi-purpose stand and module, the module has a frame coupled to the stand and an insert positioned to lie in the frame and defines a coordinate point defined by the intersection of a line extending upward from a front edge of the stand and an axis of rotation of the shoulder bolt.
Figure 6:
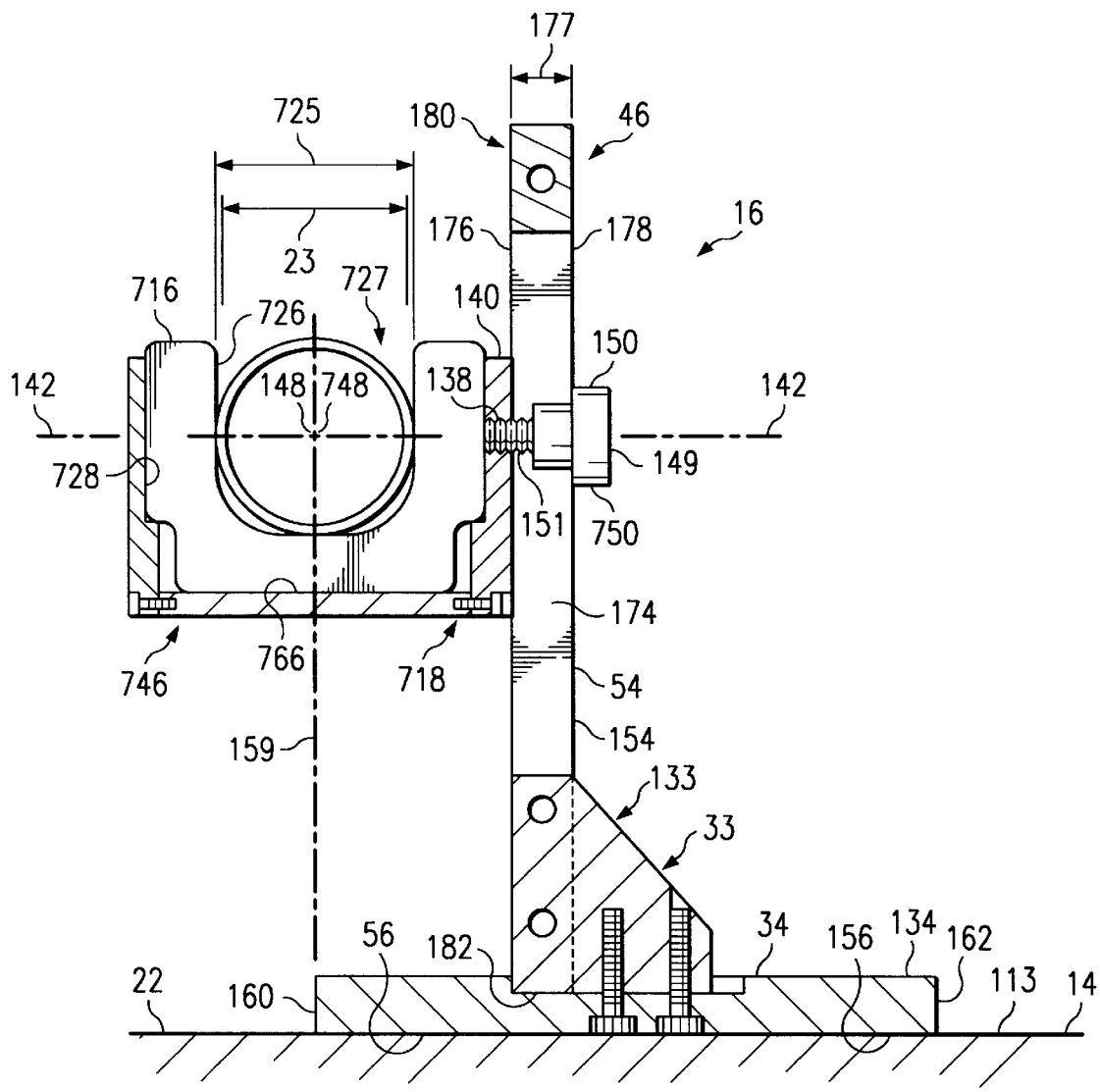
FIG. 6 is a cross-sectional view, taken along line 6—6 of FIG. 5, of the pipe fixture showing that the coordinate point corresponds to the centerline of the exhaust pipe being held therein.
Figure 32:
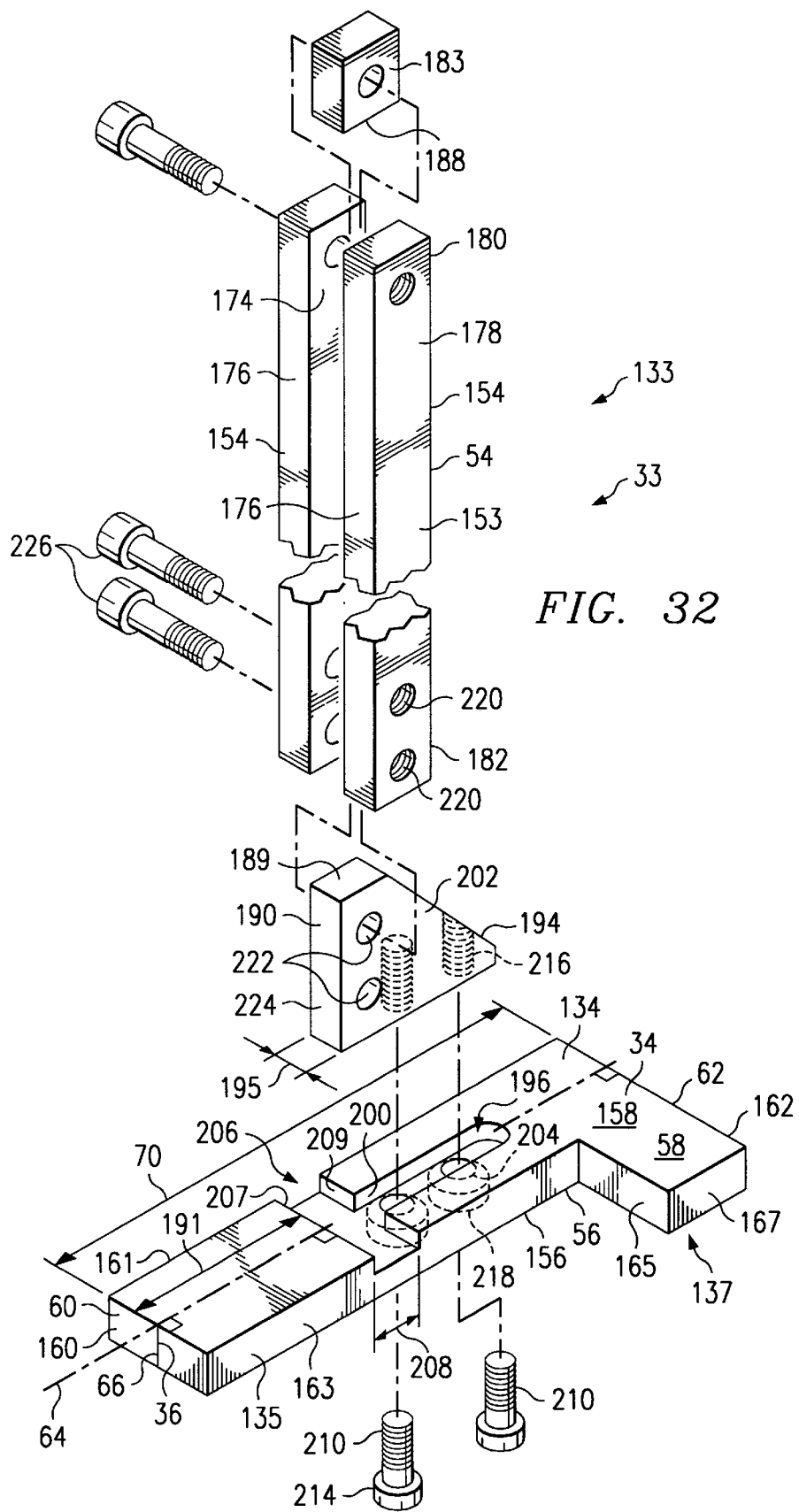
FIG. 32 is an exploded perspective view of the multi-purpose stand showing the stand including the base, upright, and a triangular support.

Multi-purpose stand 133 (FIG. 32) includes a multi-purpose base 134 and a column member or upright 154 as shown, for example, in FIG. 5. Multi-purpose base 134 is L-shaped and includes a long leg 135 and a short leg 137. Multi-purpose base 134 has a substantially planar bottom surface 156, a top surface 158 substantially parallel to bottom surface 156, a front edge wall 160, a rear edge wall 162, and a short leg front wall 165. Front edge wall 160, rear edge wall 162, and short leg front wall 165 extend between and are substantially perpendicular to bottom surface 56 and top surface 58 and are substantially parallel to each other.

Multi-purpose base 134 further includes a long side edge wall 161, a short side edge wall 163, and a short leg side wall 167. Long side edge wall 161, short side edge wall 163, and short leg side wall 167 extend between and are substantially perpendicular to bottom surface 56 and top surface 58, are substantially parallel to each other, and are substantially perpendicular to front edge wall 160, rear edge wall 162, and short leg front wall 165. Long leg 135 is defined by front edge wall 160, long side edge wall 161, and short side edge wall 163. Long leg 135 has a longitudinal axis 64 which extends from front edge wall 160 to rear edge wall 162 as shown, for example, in FIG. 5.

Long leg 135 of L-shaped base 34 is designed and arranged to accept column member 154 and has longitudinal axis 64 extending therethrough. Short leg 137 of L-shaped multi-purpose base 134 provides rotational stability to fixture and an upper surface area to which a clamp 98 may be attached for securing multi-purpose base 134 to a table surface 22.

Alignment marks 66, 68 are positioned on front edge wall 160 and rear edge wall 162, respectively. Longitudinal axis 64 of base 34 extends through alignment marks 66, 68. As discussed above, alignment marks 36 are used with the location indicia 30 on the drawing 14 to properly align base 34.

In the illustrated embodiment, multi-purpose base 134 is L-shaped to provide a small footprint (i.e., surface area of top surface 58) while still supplying sufficient stability and surface area for clamping multi-purpose base 134 to table 12. The full scale plotted drawing 14 and table 12 have limited space for bases 34 of fixtures 16. Multi-purpose base 134 of multi-purpose stand 133 has a reduced footprint or size, especially in the region of multi-purpose base 134 which is to be aligned with the projected centerline 15 of the exhaust system 11. By reducing the size of multi-purpose base 134, many more fixtures 16 can be placed upon the full scale drawing 14 and table 12.

Multiple multi-purpose bases 134 may be cut from a single piece of stock material with very little waste if the overall length of short leg 137 is twice the width of long leg 13 5. Two bases may be cut from a single rectangular piece of stock material having a width equal to overall length of short leg 137 and a length equal to overall length of long leg 135 plus width of short leg 137, assuming the kerf width of any cutting operation is also incorporated into the dimensions of the stock material. This concept can be extended so that many bases may be cut from a rectangular piece of stock material having a width equal to an integral multiple of the overall length of short leg 137 and a length equal to an integral multiple of the overall length of long leg 135 plus width of short leg 137, assuming the kerf width of any cutting operation is also incorporated into the dimensions of the stock material.

To accommodate situations when it is desirable to have two fixtures 16 in close proximity to each other and located on the same side of the projected centerline 15 of the prototype exhaust system 11, two types of multi-purpose bases 134, 134R which are mirror images of each other along longitudinal axis 64 are provided as shown in FIGS. 1 and 2A. As a result of this design, multiple stands can be located in very close proximity to each other as is often required when a close tolerance bend is designed into an exhaust system 11 to accommodate other automotive components of the vehicle to which the exhaust system 11 will be attached.

Alignment marks 66, 68 are located on front edge wall 160 and rear edge wall 162 at the point where longitudinal axis 64 intersects edge walls 160, 162. Alignment line 21 on plotted drawing 14 intersects projected centerline 15 or offset line 13 at a right angle to form an alignment cross hair 19 at a point of intersection. Alignment line 21 typically extends in both directions away from centerline 15 or offset line 13 by a distance exceeding the length 70 of long leg 135 of multi-purpose base 134.

Multi-purpose base 134 may be appropriately positioned on the drawing by aligning front edge wall 160 with projected centerline 15 or offset line 13 so that alignment mark 66 on front edge wall 160 is directly over cross hair 19 and alignment mark 68 on rear edge wall 162 is directly over the extension of alignment line 21. When a drawing 14 of an exhaust system 11 is so wide that a portion of the projection is adjacent to an edge of the table surface 22, multi-purpose base 134 can be properly aligned by simply locating front edge wall 160 along the projected centerline 15 or offset line 13 and centering alignment mark 66 on front edge wall 160 over alignment cross hair 19, so that rear edge wall 162 of multi-purpose base 134 may then extend off of the table surface 22. Having front edge wall 160 perpendicular to the longitudinal axis 64 and having alignment marks 66, 68 on both front edge wall 160 and rear edge wall 162 is redundant but does provide a check for proper alignment.

Column member 154 includes two uprights 153 formed from rectangular bars 155 having an inside surface 174, a module-engaging surface 176, a bolt head-engaging surface 178, an upper end 180, a lower end 182, an upper spacer 183 having a lower surface 188, and a lower spacer 190 having an upper surface 189. Module-engaging surface 176 of each rectangular bar 155 is located at a distance 191 from front edge wall 160 of multi-purpose base 134 along a line parallel to longitudinal axis 64. Upper spacer 183 and lower spacer 190 are positioned to lie between rectangular bars 155 at the upper ends 180 and lower ends 182, respectively, of rectangular bars 155 to maintain a lateral displacement 185 between rectangular bars 155. Inside surfaces 174 of rectangular bars 155, lower surface 188 of upper spacer 183, and upper surface 189 of lower spacer 190 define a slot 192 having a width 185. Shoulder bolt or coupler 150 includes a shaft 151 that is inserted into slot 192 and a head 149.

The illustrated embodiment of multi-purpose stand 133 relies upon the rectilinear mounting of uprights 153 with respect to multi-purpose base 134 to ensure that exhaust component modules 130 are located with a coordinate point 148 in a desired vertical and horizontal location above the drawing 14 and table 10. Multi-purpose stand 133 also includes a triangular support 194 extending between and connecting multi-purpose base 134 and uprights 153 to maintain the rectilinear relationship of stand 133 and support 194. In illustrated embodiment, as illustrated in FIGS. 5, 6, 9, 10, 11, and 14–18, triangular support 194 is integral with lower spacer 190.

Multi-purpose base 134 further includes a longitudinal groove 196 having vertically-extending side walls 200 and a width 185 equal to width 185 of slot 192, a lateral groove 206 having vertically extending front walls 207 and vertically extending rear walls 209, linear fasteners 210 having a shaft 212 and a head 214, attachment holes 204 sized to receive shaft 212 of linear fasteners 210 and extend through bottom surface 56 into longitudinal groove 196, and counter bores 218 formed in bottom surface 56 and sized to receive heads 214 of linear fasteners 210. Attachment holes 204 extend from bottom surface 56 of multi-purpose base 134 through longitudinal axis 64 of multi-purpose base 134 in the region of longitudinal groove 196. Triangular support 194 includes apertures or tapped holes 216, a thickness 195 equal to the width 185 of slot 192, side surfaces 202, and apertures or tapped holes 216 in bottom surface 56.

Triangular support 194 is seated in longitudinal groove 196 in multi-purpose base 134 so that triangular support 194 is centered upon longitudinal axis 64. Vertically-extending walls 200 of longitudinal groove 196 contact side surfaces 202 of triangular support 194 to help maintain the vertical orientation of triangular support 194. Fasteners 210 couple triangular support 194 to base 134 and heads 214 of fasteners 210 are positioned to lie in counter bores 218. To connect triangular support 194 to base 134, triangular support 194 is positioned to lie in longitudinal groove 196, attachment holes 204 of base 134 and tapped holes 216 of triangular support 194 are aligned, and triangular support 194 is secured to base by threading fasteners 210 through attachment holes 204 formed in base 134 into tapped holes 216 of triangular support 194.

Multi-purpose base 134 further includes a lateral channel 206 having a vertically-extending front wall 207 and a vertically-extending rear wall 209 spaced apart by a width 208 slightly greater than distance 177 between module-engaging surface 176 and bolt head-engaging surface 178 of uprights 153. Front wall 207 of lateral channel 206 is located known distance 191 from front edge wall 160 of multi-purpose base 134 so that when uprights 153 are received in lateral channel, module-engaging surface 176 is located the same known distance 191 from front edge wall 160 of multi-purpose base 134. Lateral channel 206 extends between long side edge wall 161 and short side edge wall 163 perpendicular to longitudinal axis 64 of multi-purpose base 134, intersects with longitudinal groove 196, and is parallel to front edge wall 160 of multi-purpose base 134.

Lower end 182 of uprights 153 are seated in lateral channel 206 in preparation for attachment of uprights 153 to multi-purpose base 134. Front and rear walls 207, 209 of lateral channel 206 are perpendicular to top surface 158 of multi-purpose base 134 and abut against module-engaging surface 176 and bolt head-engaging surface 178 of upright 153 to aid in maintaining the longitudinal perpendicular position of uprights 153 and multi-purpose base 134. Uprights 153 include attachment holes 220 near lower end 182 of each upright 153 for securing uprights 153 to triangular support 194. Triangular support 194 includes attachment holes 222 located near forward surface 224 of triangular support 194.

Triangular support 194 is attached to base 134 so that side surfaces 202 of triangular support 194 are perpendicular to top surface 58 of multi-purpose base 134. Attachment bolts 226 are inserted through attachment holes 220, 222, respectively, in uprights 153 and triangular support 194 and tightened to secure uprights 153 to triangular support 194. The bolts 226 press inside surfaces 174 of uprights 153 against side surfaces 202 of triangular support 194 to establish the perpendicular position of uprights 153 to base 134.

Attaching uprights 153 to base 134 in the previously described manner ensures that module-engaging surface 176 of upright 153 is at known distance 191 from the plane defined by front edge wall 160 of multi-purpose base 134. The distance 191 is the same as the distance between front edge wall 160 of multi-purpose base 134 and the front wall 207 of lateral channel 206.

Each exhaust component module 130 is designed so that coordinate point 148 defined by the exhaust component module 130 is known to be directly above the cross hair 19 of drawing 14 when multi-purpose stand 133 is properly aligned with the projected centerline 15 or offset line and the alignment lines 21. When exhaust component module 130 is set to a specified height as set forth by the displacement data 26, coordinate point 148 of module 130 is known to coincide precisely with a selected location in exhaust system 11. The coordinate point 148 of each module 130 may be defined in any manner by the module. The coordinate point 148 is placed at a specified displacement from any selected reference point.

The plurality of exhaust component modules 130 includes pipe module 746, bracket module 842, muffler module 644, and sensor bushing module 440. Each exhaust component module 130 includes a tapped mounting hole 138 for receiving shoulder bolt 150. While shoulder bolt 150 is loosened, exhaust component module 130 may be slid between different vertical positions relative to upright or column member 154 of multi-purpose stand 133 as shown by arrows 139 and 141 in FIG. 5 and finally secured to upright 154 of multi-purpose stand 133 at a selected position by tightening shoulder bolt 150.

Pipe module 746 includes a saddle frame 718 and a series of saddle inserts 716 positioned to lie in saddle frame 718. Saddle frame 718 is U-shaped and includes a bolt hole 740 having bore axis 142, a pair of saddle insert-receiving slots 720, and a coordinate point 748. Saddle inserts 716 are shaped to be received in the saddle insert receiving slots 720 of frame 718 and include a central axis 764, a bottom surface or frame-engaging portion 766, and an inner edge or exhaust system-engaging portion 726.

Figure 30:
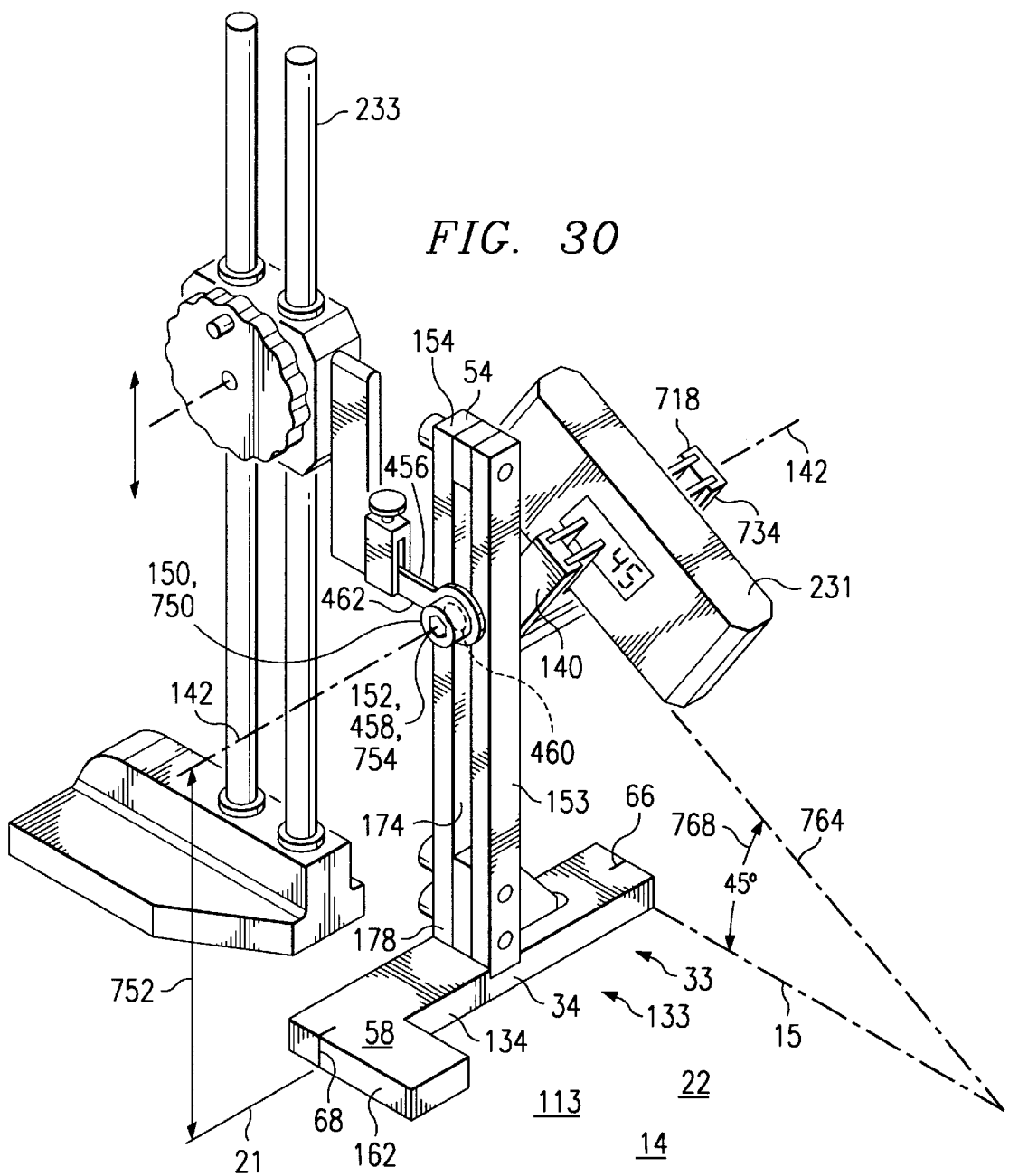
FIG. 30 is a perspective view of a pipe fixture and digital height gauge showing the digital height gauge having a bolt head-encompassing attachment measuring the height of the coordinate point of the pipe module and a digital protractor measuring the angular position of the pipe module.

Pipe modules 746 are attached to multi-purpose stands 133 and are used to support and align exhaust pipe 18 during assembly of exhaust system 11. To properly position exhaust pipe 18, pipe fixture 46 must be properly aligned on plotted drawing 14 and saddle frame 718 must be positioned at a predetermined height 752 and at a predetermined angle 768 relative to working surface 22 as shown in FIG. 30. Pipe fixture 46 is aligned on plotted drawing 14 by positioning front edge wall 160 along centerline 15 indicated on plotted drawing 14. Next, front alignment mark 66 is positioned to align with a cross hair 19 located on the centerline 15 on plotted drawing 14. Thus, pipe fixture 46 has been aligned with cross hair 19 to a particular point and orientation on plotted drawing 14. As shown by line 159 in FIGS. 5 and 6, coordinate point 748 aligns with front edge wall 160 so that when front edge wall 160 is aligned with the centerline 15 indicated on the plotted drawing 14, coordinate point 748 is also aligned with centerline 15 indicated on the plotted drawing 14. After placing pipe fixture 46 on plotted drawing 14, pipe fixture 46 is mounted to flat surface 22 of table 10 by tie-down clamps 98 as shown in FIGS. 1 and 2A.

To adjust height 752 to the height indicated by displacement data 26 of plotted drawing 14, shoulder bolt 750 is loosened so that saddle frame 718 is free to move up and down upright 154. Height of center 754 of shoulder bolt 750 corresponds to height 752 of coordinate point 748 so that if the height of center 754 of shoulder bolt 750 is measured, the height 754 of coordinate point 748 is also measured. A digital height gauge 233 measures the height of center 754 of shoulder bolt 750 by using a shoulder bolt gauge arm 456 as shown, for example, in FIG. 30. Shoulder bolt gauge arm 456 includes a shoulder bolt-receiving aperture 460 having a center 458 and a first edge 462 that aligns with center 458 of shoulder bolt gauge arm 456. Center 458 of shoulder bolt gauge arm 456 matches center 754 of shoulder bolt 750 when shoulder bolt 750 is positioned to lie in shoulder bolt-receiving aperture 460 as shown in FIG. 30. Therefore, when a digital height gage 233 measures the height of first edge 462, it also measures the height of center 754 of shoulder bolt 750 which corresponds to the height 752 of coordinate point 748. After raising or lowering pipe module 746 to a predetermined height up or down upright 154, a user tightens shoulder bolt 750 to secure pipe module 746 at the desired height.

An additional adjustment that can be made to pipe module 746 is adjustment of angle 768 measured between central axis 764 extending through coordinate point 748 perpendicular to bore axis 142 and working surface 22. Central axis 764 is parallel to bottom surface 766 of saddle frame 718. A digital protractor 231 is placed on bottom surface 766 of saddle frame 718 to indicate angle 768 as shown in FIG. 30. Shoulder bolt 750 that couples saddle frame 718 to support column 712 is then loosened so that angle 768 can be adjusted. Once angle 768 is at the angle indicated by angular data 27 on plotted drawing 14, shoulder bolt 750 is tightened to secure angle 768.

Saddle frames 718 support a series of interchangeable saddle inserts 716 as shown in FIG. 2A. Interchangeable saddle inserts 716 come in a variety of sizes. Each insert 716 includes an inner edge 726 defining an opening 727 having a width or size 725 as shown, for example, in FIG. 6. Different inserts 716 may have openings 727 of different widths or sizes 725. The openings 727 receive a variety of sized exhaust pipes 18. Thus, pipe stands 46 can be used with exhaust pipes 18 of different diameters 23 by switching to a saddle insert 716 having an appropriate sized opening 727. Also, if a user desired to have a tight tolerance on a particular exhaust pipe 18, he could insert an interchangeable saddle insert 716 having tight dimensional specifications as dictated by the size of opening 727. If a user desired to have a loose tolerance on a particular exhaust pipe 18, he could insert an interchangeable saddle insert 727 having a larger opening 727.

As shown in FIGS. 2A and 5–8, interchangeable saddle inserts 716 slide into slots 728 formed in saddle frame 718 for convenient removal and insertion of interchangeable saddle inserts 716 on pipe module 746. The saddle frame 718 is connected to upright 154 so that inserts 716 do not have to be connected to upright 154.

Saddle frame 718 also holds a gauge insert 730 as shown in FIGS. 2A. Gauge insert 730 includes a center marking 732 that aligns with coordinate point 748 of saddle frame 718 of pipe module 746. After each of the pipe fixtures 46 has been mounted to flat surface 22 and gauged with the digital readout height gauge 233, the gauge insert 730 is placed in each of the saddle frames 718 of each pipe fixture 46. While the gauge insert 730 is placed in each of the respective saddle frames 718 of each pipe fixture 46, a coordinate-measuring machine (CMM) (not shown) is used to determine the coordinates of the center marking 732 of the gauge insert 730 from a reference point or origin of a selected coordinate system. These measurements are then compared with a pre-calculated coordinates of where in relation to the origin each coordinate point 748 of saddle frame 718 should be in accordance with the plotted drawing 14. If the center marking 732 of gauge insert 730 which aligns with the respective coordinate point 748 of respective saddle frame 718 of respective pipe fixture 46 is not within a specified tolerance according to the plotted drawing 14, the respective pipe stand 46 is unmounted from flat surface 22 and remounted to the correct location according to plotted drawing 14.

After the table 10 has been set up and gauged with the CMM, the table 10 is rolled on the caster wheels 52 to the bend area of the manufacturing plant. Then, the bend area laborers manufacture the components 20 of the exhaust pipe 18 according to engineering specifications. Having secured the series of fixtures 16 to flat surface 22 as indicated by plotted drawing 14, exhaust pipe 18 is then mounted to the series of fixtures 16. A user is then able to determine if exhaust pipe 18 has been manufactured correctly by determining whether it fits within the series of fixtures 16.

Pipe fixtures 46 also include a dual saddle frame 734 that can be used instead of saddle 718. Dual saddle frame 734 is similar to saddle frame 718, but it includes two slots 736 to hold two saddle inserts 716. By providing two saddle inserts 716, exhaust pipe 18 is held by the two saddle inserts 716 to a tighter tolerance to simulate a connection to a mating exhaust system component 20. Because exhaust pipe 18 must fit within two saddle inserts 716 when dual saddle frame 734 is used, less tolerance is available for the position of exhaust pipe 18 than when exhaust pipe 18 fits within a single saddle frame 718. Therefore, exhaust pipe 18 is more likely to align with a mating exhaust system component 20 when dual saddle insert fixture 734 is used than when single saddle insert 716 is used. Dual saddle frame 734 is positioned on plotted drawing 14 and gauged with the CMM in the same manner as saddle frame 718.

Having dual saddle frames 718, 734 mounted on pipe stands 46 to specify the proper location of exhaust system components 20, the tube bending laborer can place the exhaust pipe 18 onto the table 10 to gauge and check the dimensional quality of the exhaust pipe 18 just produced. If the exhaust pipe 18 does not fit within the saddle inserts 716 of the pipe fixture 46, the laborer knows the exhaust pipe 18 is not properly bent. The laborer can then rework exhaust pipe 18, regauge the bending equipment (not shown), or seek out other methods to discover why the exhaust pipe 18 does not fit within the given tolerance built into the table 10 upon setup.

Figure 7:
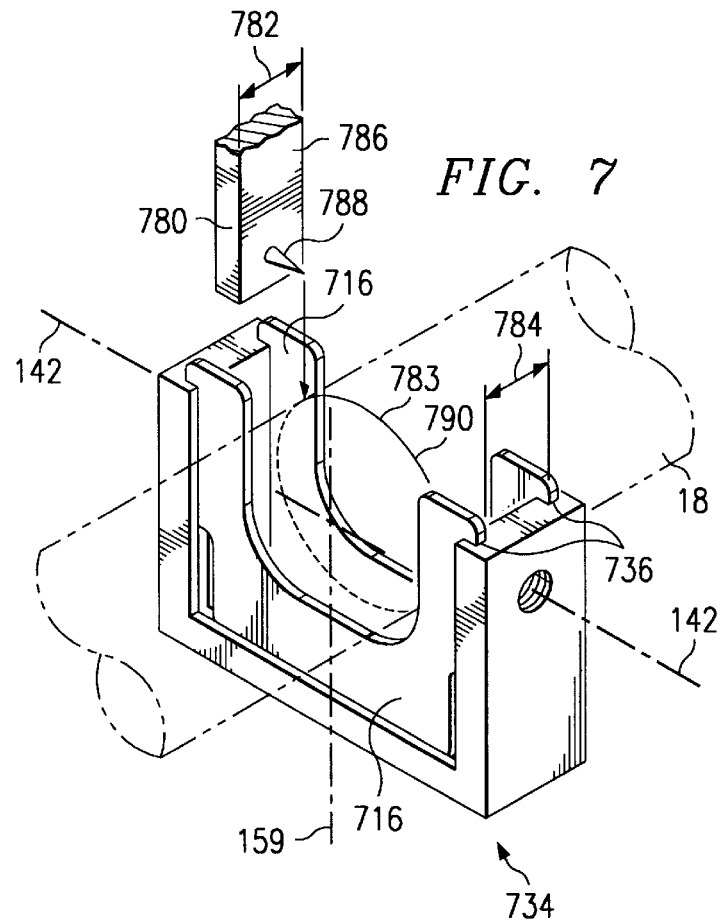
FIG. 7 is a perspective view of a double insert pipe stand module and a scribing tool showing the scribing tool inserted between the inserts to scribe the pipe at the location where the pipe is to be cut.

Pipe fixture 46 having dual saddle frame 734 can be located at the desired end of exhaust pipe 18 so that the length of exhaust pipe 18 may be gauged. If an alignment line 21 is located at the projected end of exhaust pipe 18 on drawing 14 and pipe fixture 46 having a dual saddle frame 734 is properly positioned over the alignment line 21, then the end of the exhaust pipe 18 should be at a midpoint 783 between the two inserts 716 received in the dual saddle frame 734 as shown in FIG. 7. Typically, tubing having a greater overall length than is required to form exhaust pipe 18 is bent to form exhaust pipe 18. When the bent exhaust pipe 18 is inserted in the fixtures 16, the end of exhaust pipe 18 typically extends beyond the midpoint 783 between the two inserts 716 received in dual saddle frame 734 as shown in FIG. 7.

A scribing tool 780 having a width 782, a body 786, and a pointed tip 788 extending from body 64 may be inserted between the two inserts 716 in the dual saddle frame 734 to scribe the appropriate length on the exhaust pipe 18 as shown in FIG. 7. The width 782 of tool 780 is slightly less than the displacement 784 between the two inserts 716 held in the dual saddle frame 734. The exhaust pipe 18 may then be removed from the fixtures 16 and cut along the scribed mark to the desired length.

Figure 8:
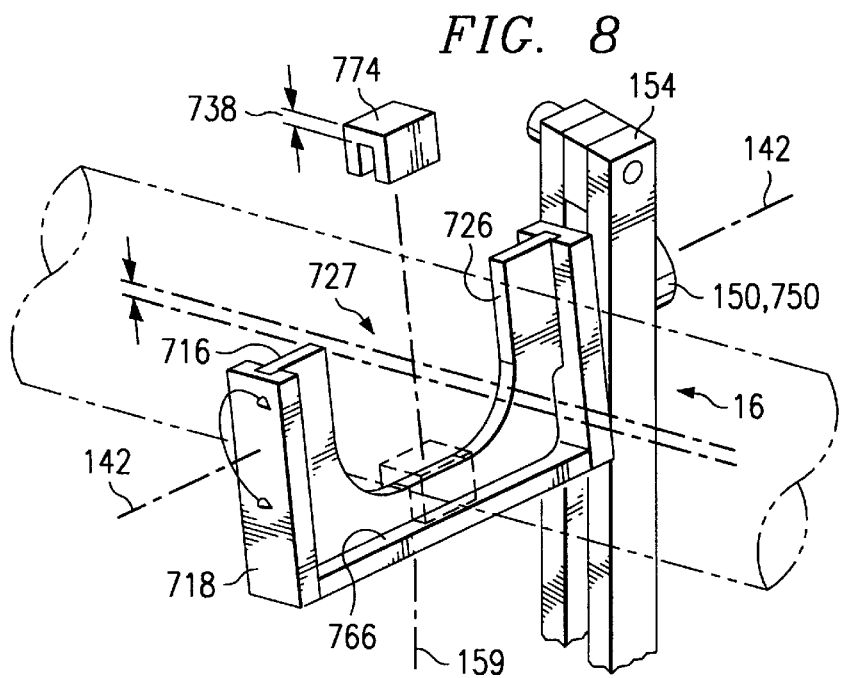
FIG. 8 is a perspective view of a pipe fixture showing the single insert pipe stand module attached to the multi-purpose stand and a tolerance shim positioned to lie on the insert.

Pipe fixtures 16 support exhaust pipe 18 as a welder tack-welds the exhaust system components 20. To aid in this supporting function, pipe modules 746 further include a set of tolerance shims 774 as shown, for example, in FIG. 8. Tolerance shims 774 are placed on saddle inserts 716 when a tolerance has been built into saddle inserts 716 or dual saddle insert 734. Tolerance shims 774 include a thickness 738 that corresponds to the tolerance built into saddle inserts 716 or dual saddle insert 734. Therefore, when exhaust pipe 18 is near zero tolerance of the specification, the exhaust pipe 18 is not supported by saddle insert 716 or dual saddle insert 734 because a gap exists between the exhaust pipe 18 and the saddle insert 716 or dual saddle insert 734 that is created by the built-in tolerance of the selected saddle insert 716 or dual saddle insert 734. To fill in this gap and support the exhaust pipe 18 that is near zero tolerance, a user places tolerance shims 774 on saddle insert 716 or dual saddle insert 734 to compensate for the built-in tolerance as shown in FIG. 8.

Sensor fixture 40 includes sensor module 440 coupled to a multi-purpose stand 133. Sensor module 440 includes a height bracket addition 418 connected to column member 154 of multi-purpose stand 133 by shoulder bolt or coupler 450, a height bracket 416 coupled to height bracket addition 418, and a bushing actuator 426 connected to height bracket 416 as shown, for example, in FIGS. 9–12. Height bracket 416 includes a bolt hole 439 having an axis 437 about which height bracket 416 is adjustable relative to height bracket addition 418. Height bracket 416 further includes a bushing actuator aperture (not shown). Height bracket addition 418 is L-shaped and includes first and second bolt holes 430, 432. Height bracket addition 418 does not rotate relative to stand 133.

The location indicia 30 on drawing 14 provide the proper location of multi-purpose base 134. The alignment mark of multi-purpose stand 133 when it is being used with sensor module 440 is short leg side wall 167. Sensor fixture 40 must be properly aligned on plotted drawing 14, height bracket 416 must be positioned at a proper height 452, and bushing actuator 426 must be placed at a predetermined angle 468 relative to working surface 22.

Bushing actuator 426 includes a shaft 436 having a first end 480 and a second end 482, a threaded copper tip 438, a stop collar 484, a stop collar set screw 486, a handle 434, a handle set screw 488, and a central axis 464. Sensor module 440 defines a coordinate point 448 at the intersection of central axis 464 of bushing actuator 426 and first end 480 of shaft 436. Drawing 14 includes a sensor alignment point 472 and coordinate point 448 is positioned vertically above sensor alignment point 472 as shown in FIGS. 10–12.

Figure 9:
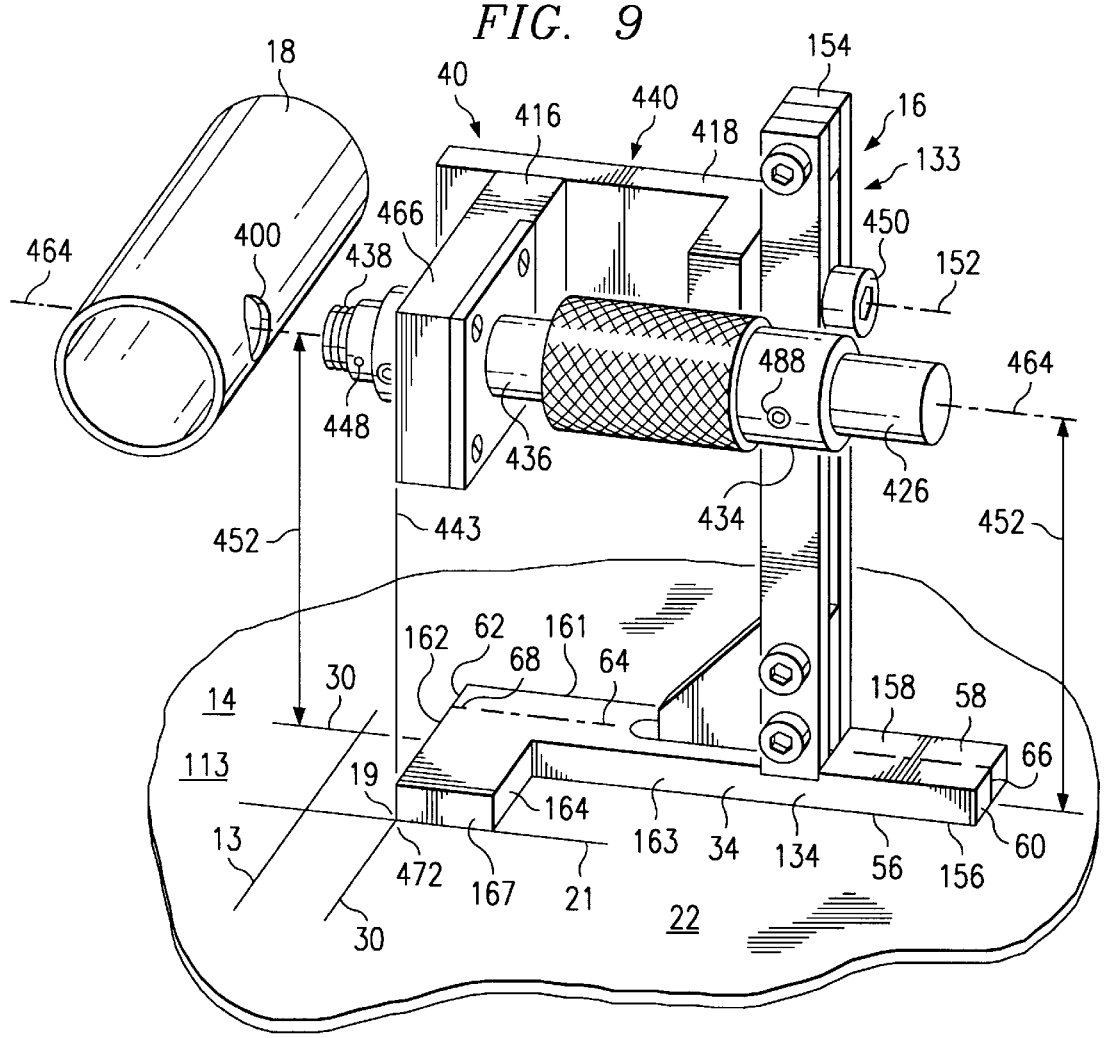
FIG. 9 is a perspective view of a sensor fixture showing a sensor stand module attached to a multi-purpose stand, the sensor stand module including an actuator and a threaded copper tip.

The sensor fixture 40 is adjusted to place coordinate point 448 in the proper position as follows. Drawing 14 includes two indicia for sensor fixture 40, an alignment line 21 and an alignment point 472. Sensor alignment point 472 lies on alignment line 21 to form a crosshair 19. Multi-purpose stand 133 of sensor fixture 40 is aligned on plotted drawing 14 by positioning short leg side wall 167 of multi-purpose base 134 on alignment line 21 on plotted drawing 14. The base 133 may thereafter be moved on drawing 14 as long as short leg side wall 167 remains aligned with alignment line 21 of drawing 14. The displacement data 26 provides the height 452 that coordinate point 448 should be relative to alignment point 472 of drawing 14. If central axis 464 of actuator 426 is parallel to surface 22 as shown in FIG. 9, the height 452 is adjusted as described for pipe fixture 46 because if central axis 464 of actuator 426 is parallel to surface 22, the height of a center 454 of shoulder bolt 450 corresponds to height 452 of coordinate point 448.

Figure 10:
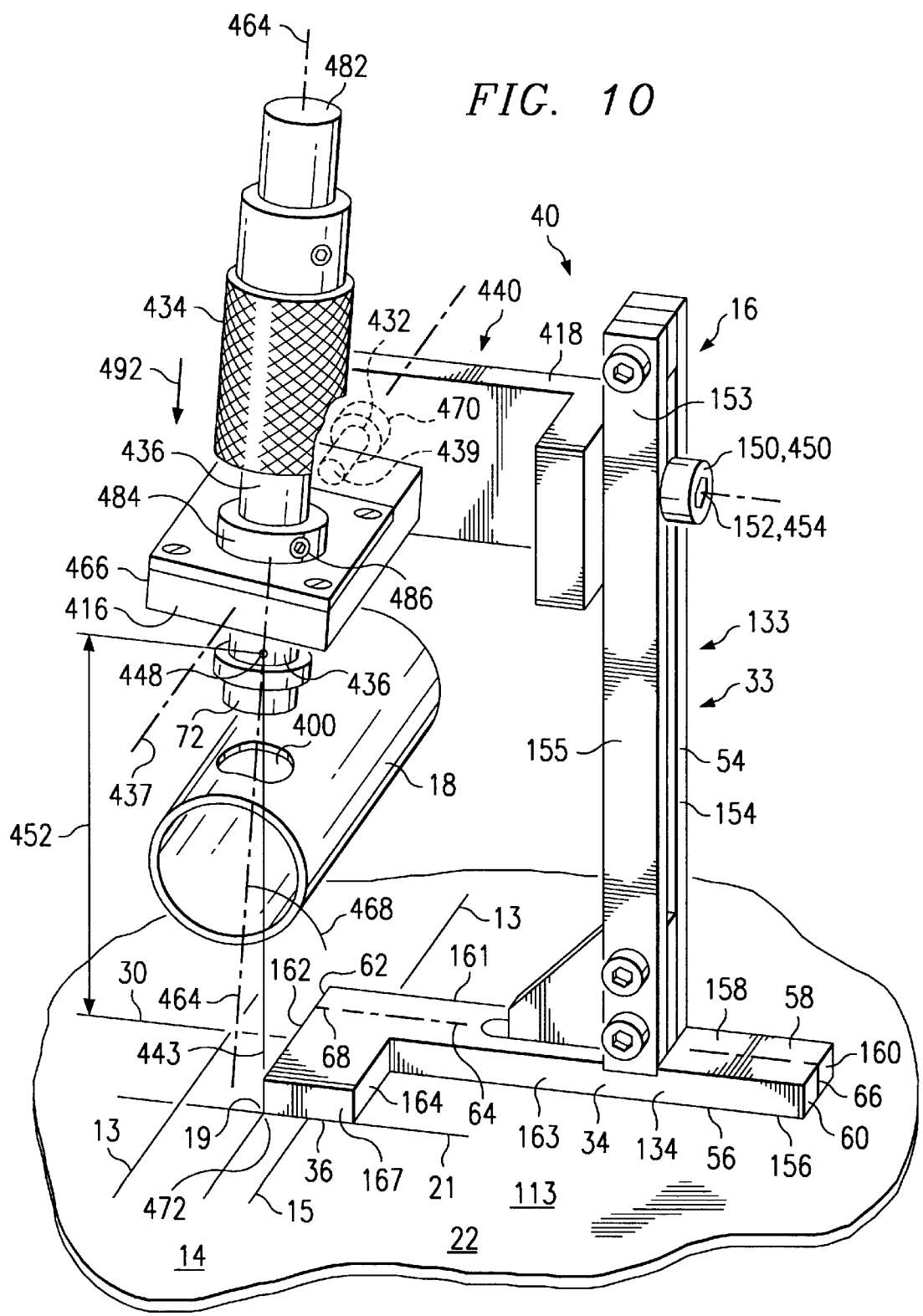
FIG. 10 is a perspective view of the sensor fixture of FIG. 9 showing a sensor bushing received on the threaded copper tip prior to insertion of the bushing into an aperture formed in the pipe.
Figure 11:
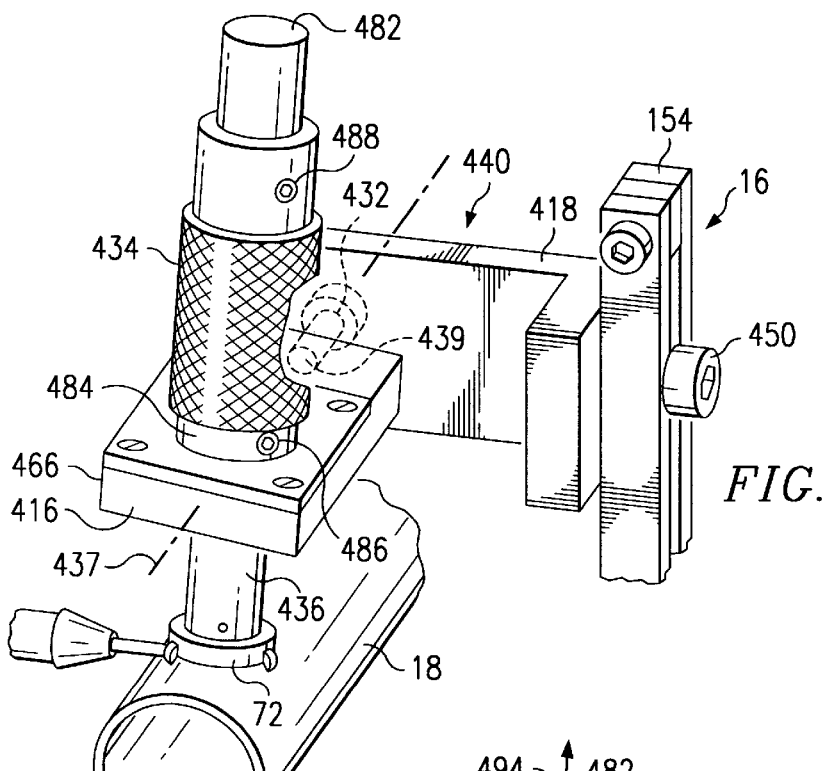
FIG. 11 is a perspective view of the sensor fixture of FIG. 10 showing the bushing inserted into the aperture and the fixture being welded to the exhaust pipe.
Figure 12:
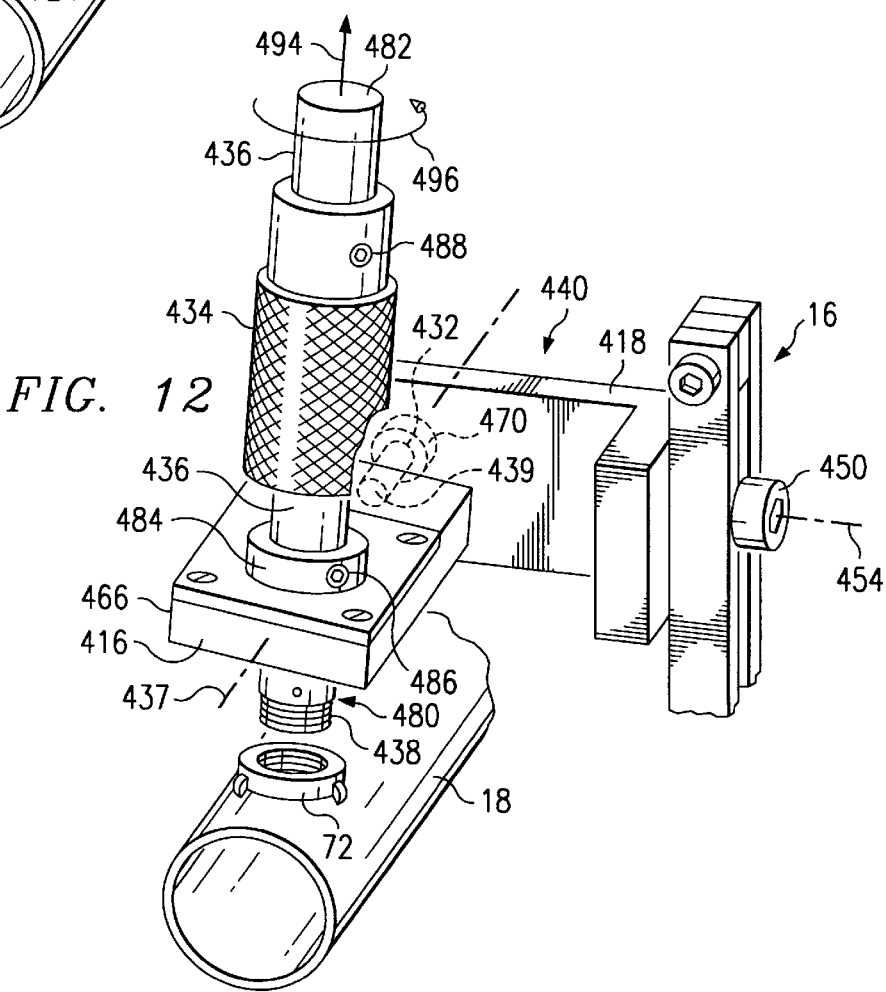
FIG. 12 is a perspective view of the sensor fixture of FIG. 11 after the handle of actuator has been rotated and pulled away from the bushing welded to the pipe.

However, displacement data 26 may specify that height bracket 416 be rotated about axis 437 relative to height bracket addition 418 as shown in FIGS. 10–12. More specifically, displacement data 26 specifies an angle 468 measured between central axis 464 of actuator 426 and flat surface 22. Central axis 464 of actuator 426 is parallel to a surface 466 of height bracket 416 as shown in FIG. 9. A digital protractor 231 is placed on surface 466 to measure angle 468. A bolt 470 that couples height bracket 416 to height bracket addition 418 is loosened so that angle 468 can be adjusted. Once angle 468 is substantially that as indicated by displacement data 26, bolt 470 is tightened.

To set coordinate point 448 at the height 452 specified by displacement data 26 above alignment point 472, the user may adjust one or more of the following components. First, height addition bracket 418 and height bracket 416 may be raised and lowered relative to surface 22. Second, by loosening stop collar 484, sliding actuator 426 along its longitudinal axis 464, and locking actuator 426 in a different position by tightening stop collar 484. Once the height 452 is set, the base 134 may be slid along the drawing 14 to position the coordinate point 448 in a location vertically above alignment point 472 on drawing 14. A square may be used to verify the location of coordinate point 448 relative to alignment point on drawing 14.

Threaded copper tip 438 is attached to first end 480 of shaft 436 and receives an internally threaded sensor bushing 72 as shown in FIG. 10. Threaded copper tip 438 is made of copper to inhibit welding spray from attaching thereto. Handle 434 is attached for movement relative to second end 482 of shaft 436 by frictional engagement of shaft 436 by handle set screw 488. Stop collar 484 is attached for movement relative to shaft 436 by frictional engagement of stop collar set screw 486 with shaft 436. Shaft 436 of actuator 426 is positioned to extend through bushing actuator aperture (not shown).

After the coordinate point 448 is set in the proper position as described above, actuator 426 is moved in direction 494 so that an exhaust pipe 18 may be placed adjacent to sensor fixture 40. To position a sensor bushing 72 in an aperture 400 formed in exhaust pipe 18, a user places a sensor bushing 72 on threaded bushing tip 438. Shaft 436 is moved in direction 492 towards exhaust pipe 18 to position sensor bushing 72 in aperture 400 as shown in FIG. 10. The user is then able to tack-weld or otherwise couple bushing 72 in place as shown in FIG. 11. After tack-welding the bushing 484 to pipe 18, handle 434 is moved in direction 494 away from pipe 18 while handle 434 is rotated in direction 496 about central axis 464 to unscrew threaded tip 438 from bushing 72 as shown in FIG. 12.

Figure 13:
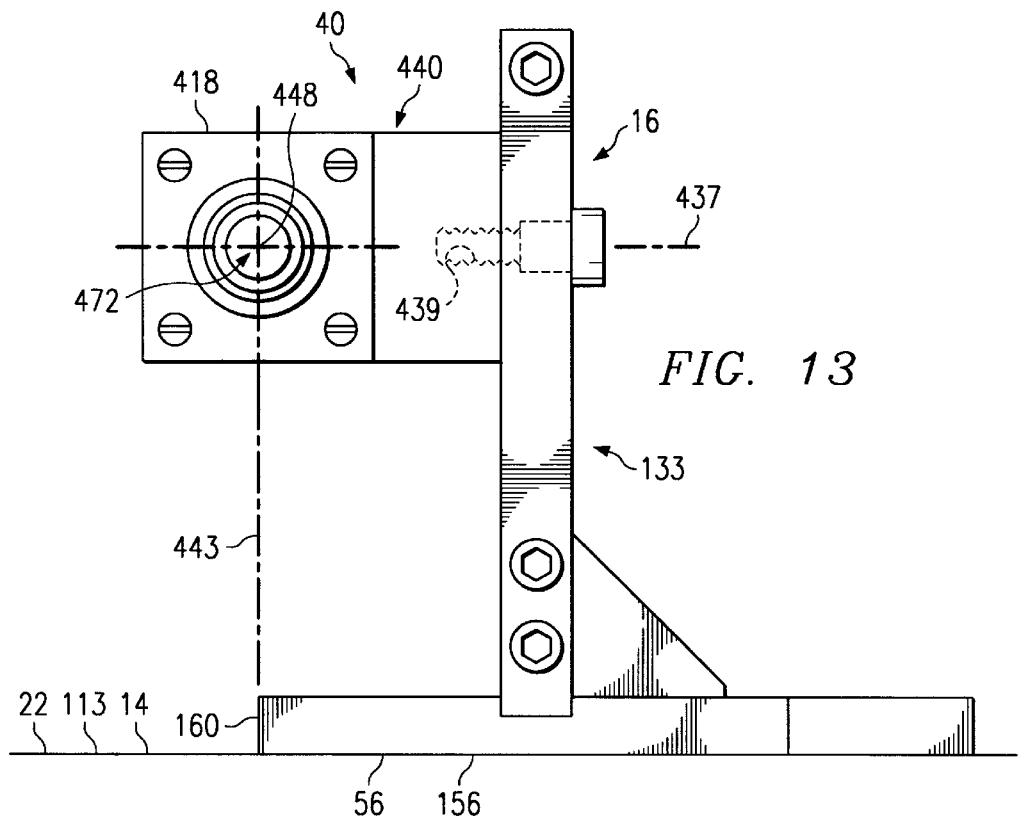
FIG. 13 is a side elevation view of another sensor fixture.

Sensor module 440 may be reconfigured to remove height bracket addition 418 as shown in FIG. 13. By removing height bracket addition 418 and coupling height bracket 416 directly to support column 412, central axis 464 is shifted ninety-degrees in relation to support column 412.

Figure 15:
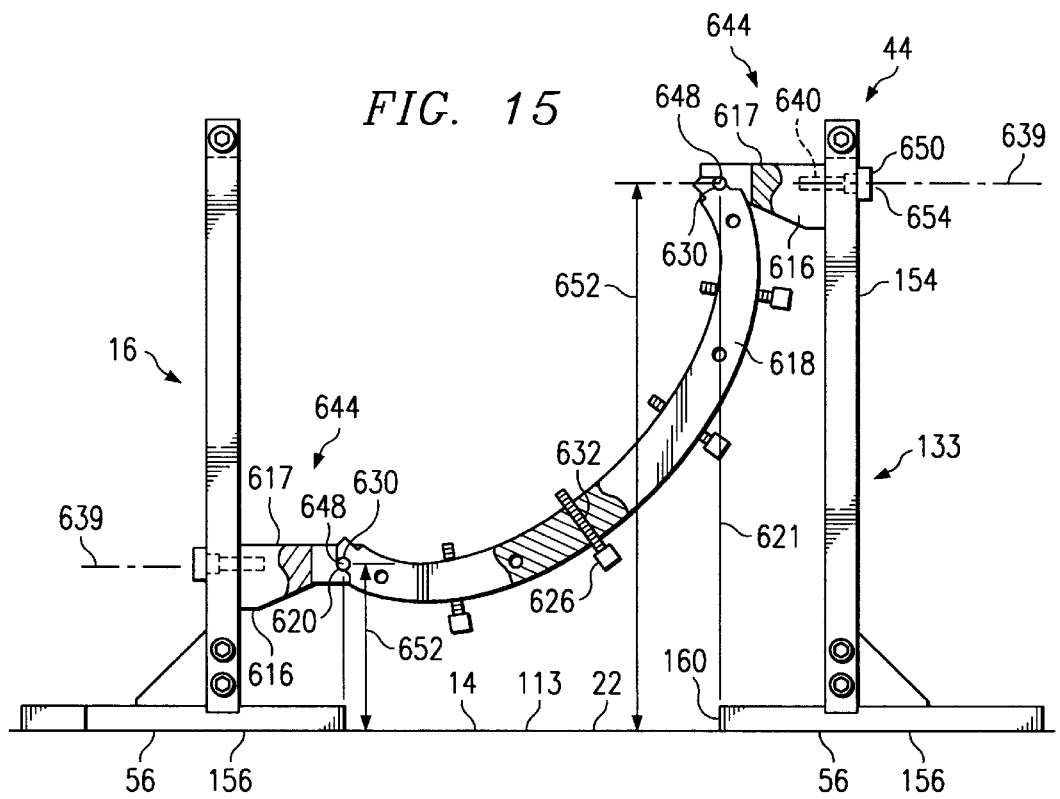
FIG. 15 is a side elevation view, with portions cut away, of two multi-purpose stands, two muffler modules coupled to the stands, and a muffler support showing the muffler fixture including threaded adjustment bolts extending through the muffler support.
Figure 14:
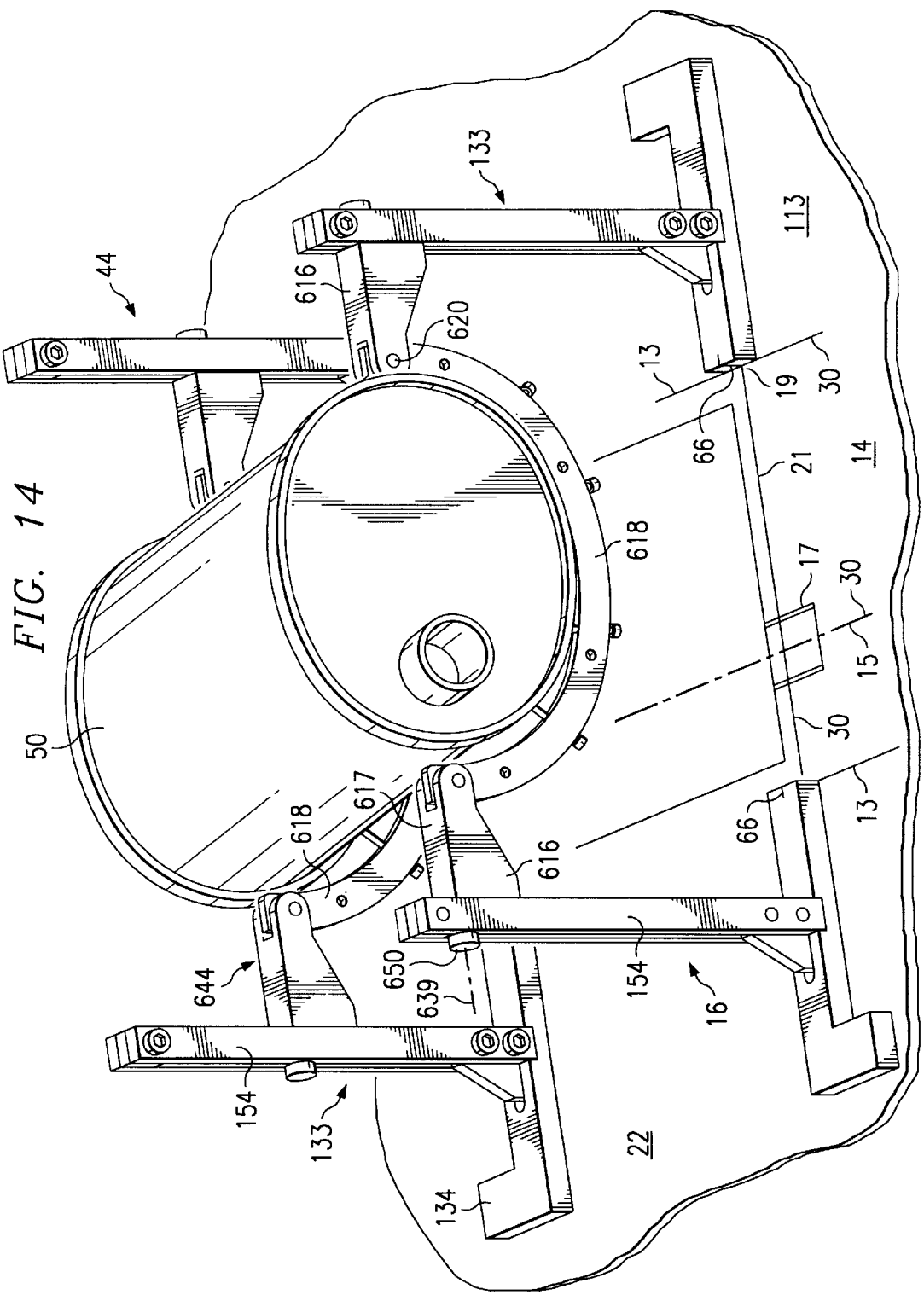
FIG. 14 is a perspective view of a muffler fixture showing the muffler fixture having four multi-purpose stands, a muffler module coupled to each multi-purpose stand, and a pair of muffler supports coupled to the muffler modules to support a muffler.

Muffler fixture 44 is used to support and align mufflers 50 during assembly of exhaust system 11. Muffler fixture 44 includes four muffler modules 644, two muffler supports or saddles 618, and four multi-purpose stands 133 as shown in FIGS. 14 and 15. A muffler module 644 is connected each stand 133. The multi-purpose stands 133 act in pairs as a muffler saddle 618 is positioned to extend between a pair muffler modules 644.

Muffler saddle 618 is coupled to muffler modules 644 by placing pin notches 630 of muffler saddle 618 on pin 620 of muffler module 644. Muffler saddles 618 are curved bars that are sized and shaped to support a wide variety of muffler sizes and shapes.

Each muffler module 644 includes a height bracket 616 having a top surface 617 and a shoulder bolt 650 for securing height bracket 616 to column member 154, as shown in FIGS. 14 and 15. Height bracket 616 includes a bolt hole 640 having a hole axis 639 about which height bracket 616 rotates and a pin 620 defining a coordinate point 648. Muffler saddle 618 is C-shaped to match the cross-section of mufflers 50 and includes pin notches 630, screw holes 632, and adjustment members or screws 626 threadingly positioned to lie in screw holes 632.

To position a muffler 50 properly on exhaust pipe 18, muffler fixture 44 must be aligned properly on plotted drawing 14, height brackets 616 must be positioned at a predetermined height, and adjustment screws 626 must support muffler 50 properly. Muffler fixture 44 is aligned on plotted drawing 14 by positioning front edge wall 160 of multi-purpose base 134 along offset line 13 indicated on plotted drawing 14. Next, alignment indicator 66 is positioned to align with a cross hair 19 located on offset line 13 on plotted drawing 14. Thus, muffler fixture 44 has been aligned with a cross hair 19 to a particular orientation to plotted drawing 14.

As shown by line 621 in FIG. 15, coordinate point 648 aligns with front edge wall 160 so that when front edge wall 160 is aligned with the offset line 13 indicated on the plotted drawing 14, coordinate point 648 is also aligned with the offset line 13 indicated on the plotted drawing 14. After properly orienting muffler fixture 44 on plotted drawing 14, muffler fixture 44 is mounted to flat surface 22 of wheeled table 12 by tie-down clamps 98 as shown in FIGS. 1 and 2A.

A user adjusts a height 652 measured from coordinate point 648 to flat surface 22 to position muffler saddle 618 for mounting muffler 50 to exhaust pipe 18. To adjust height 652 to a predetermined height indicated by plotted drawing 14, shoulder bolt 650 is loosened so that height bracket 616 is free to move up and down support column 154 of multi-purpose stand 133. Height of center 654 of shoulder bolt 650 corresponds to height 652 of coordinate point 648 so that if height of center 654 of shoulder bolt 650 is measured, height 654 of coordinate point 648 defined by pin 620 is also measured. Measurement of height of center 654 of shoulder bolt 650 of muffler stand 44 is accomplished in the same manner as the measurement of height 752 of coordinate point 748 defined by saddle frame 734 of pipe fixture 46 as previously discussed. After raising or lowering height bracket 616 to a predetermined height up or down column member 154, a user tightens shoulder bolt 650 to secure height bracket 616.

Muffler modules 644 can be rotated about hole axis 639 of attachment hole 640 to accommodate mufflers 50 which are angled with respect to flat surface 22. The angle of each muffler module 644 can be set using a digital protractor 231 placed on top surface 617 of muffler module 644 in the same fashion as the angle of the saddle frames 718 of pipe fixture 46 were set as described above.

After placing muffler 50 in muffler saddles 618, an adjustment can be made to the position of muffler 50 relative to muffler saddles 618. Adjustment screws 626 allow the muffler saddle 616 to be adjusted to hold a muffler 50 at different positions according to the outer surface configuration of muffler 50. Adjustment screws 626 include a tip or exhaust component-engaging portion that is spaced apart from muffler saddles 618. By raising or lower adjustment screws 626 in relation to muffler saddles 616 by screwing screws in and out of screw holes 632, muffler 50 can also be raised or lowered in relation to muffler saddle 616. Such adjustments may become necessary to accommodate for twist or other irregularities in the outer surface configuration of muffler 50. Muffler saddles 618 can also be used to hold other exhaust system components 20 such as catalytic converters (not shown), resonators (not shown), or other such exhaust system components 20.

Muffler fixtures 44 can be gauged with the CMM by measuring the X, Y, and Z coordinates of the pins 620 of the muffler stands 44 from the origin of the selected Cartesian coordinate system. If the pins 620 are not in proper position according to the plotted drawing 14, the muffler fixtures 44 can be unmounted and remounted to the correct specification. All measurements taken by the CMM are recorded for reference in the future as historical records.

Figure 16:
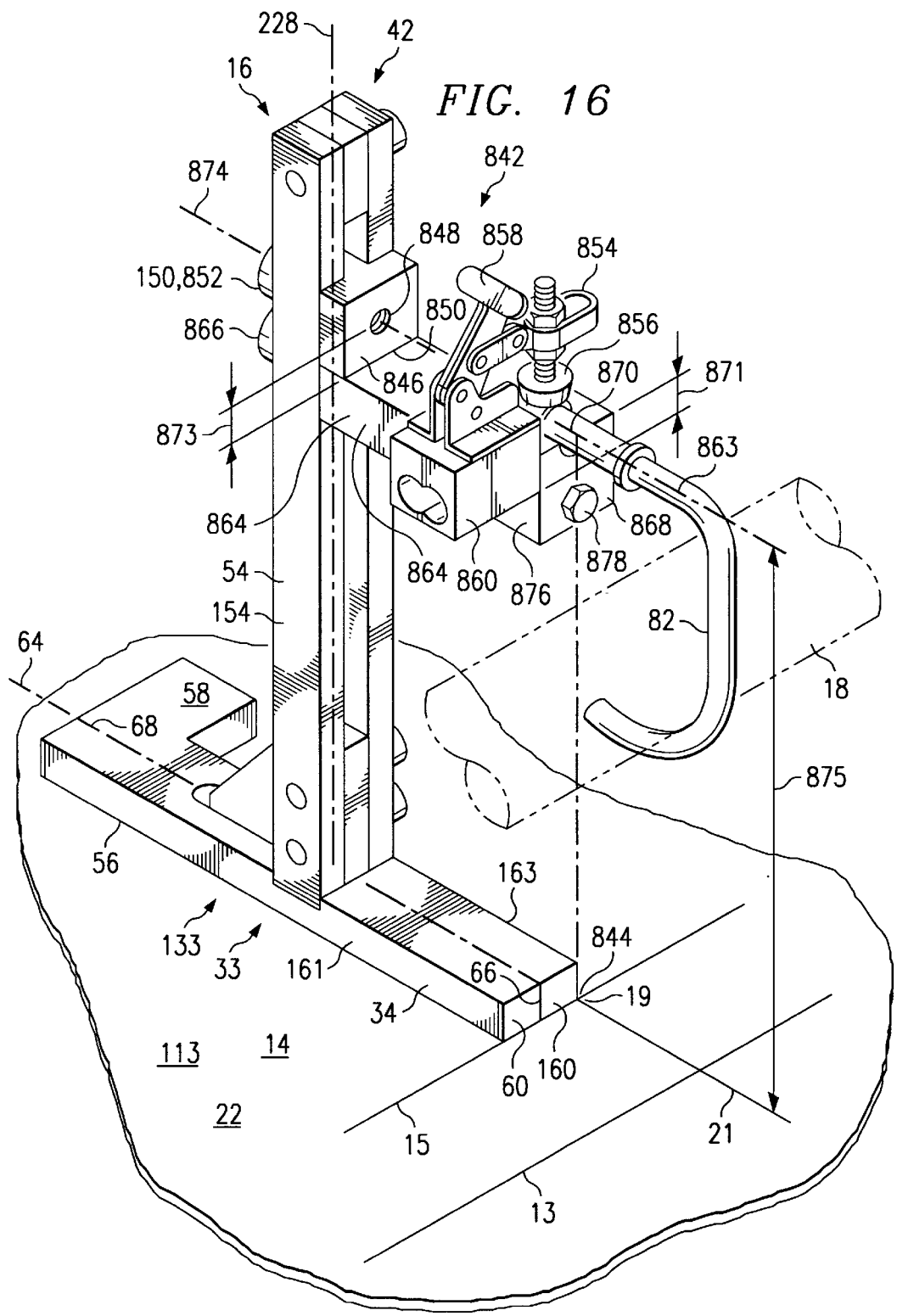
FIG. 16 is a perspective view of a bracket fixture showing the bracket fixture including a multi-purpose stand and a bracket module having a bracket stop and bracket frame attached to the multi-purpose stand, the bracket frame including a clamp receiving a bracket so that the bracket is held in contact with the exhaust pipe.
Figure 17:
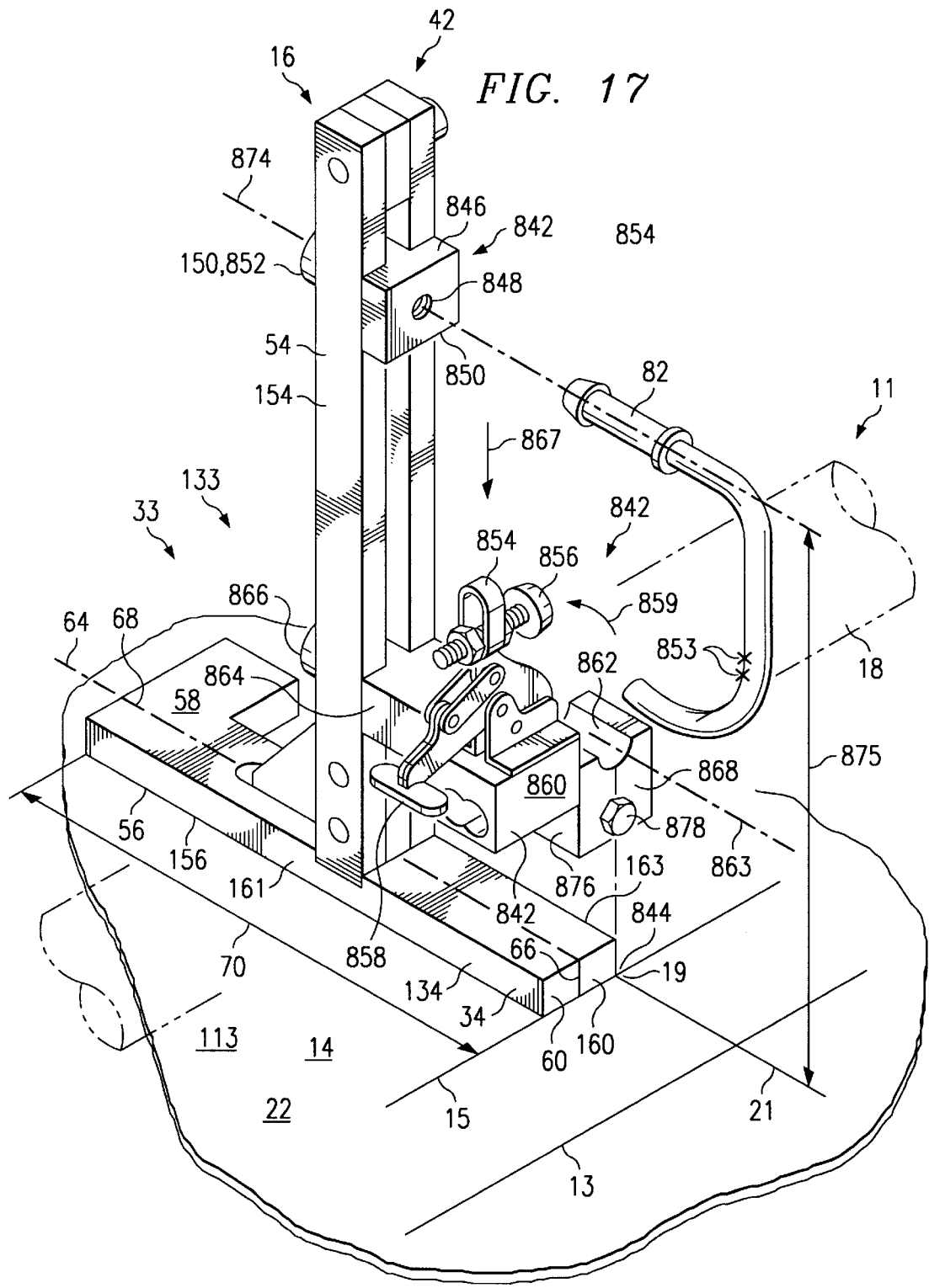
FIG. 17 is a perspective view of the bracket fixture of FIG. 16 showing the bracket frame lowered away from the bracket stop after the bracket has been tack-welded to the exhaust pipe.

Bracket fixture 42 includes a bracket module 842 coupled to a multi-purpose stand 133 as shown in FIGS. 16 and 17. Bracket module 842 positions a bracket 82 in relationship to exhaust system 11. When stand 133 is used with bracket module 842, alignment mark 36 of multi-purpose stand 133 is an edge or corner 844 between short side edge wall 163 and front edge wall 160 as shown in FIGS. 16 and 17. Using edge 844 as alignment mark 36, stand 133 is aligned on drawing 14.

Bracket 82 is used to couple exhaust system 11 to a vehicle. Bracket module 842 includes a height bracket stop 846 having a bolt-receiving hole 848 and a bottom surface 850, a stop shoulder bolt 852, a clamp 854 having a rubber pad 856 and a handle 858, and a bracket-receiving block 860 having a bracket groove 862, a bracket frame 864, and a frame shoulder bolt 866. Clamp 854 is attached to bracket-receiving block 860 which is attached to bracket frame 864. Bracket-receiving block 860 includes a face 868 and bracket groove 862 includes an axis 863 as shown in FIGS. 16–17. Bracket module 842 is coupled by stop shoulder bolt 852 and frame shoulder bolt 866 to a column member 154 of a multi-purpose stand 133.

Bracket module 842 defines a coordinate point 870 at the intersection of axis 863 of bracket groove 862 and face 868 of bracket-receiving block 860. Coordinate point 870 is displaced vertically from bracket frame 864 by a height 871 equal to the distance 873 between center of bolt-receiving hole 848 and bottom surface 850 of height bracket stop 846 as shown in FIG. 16. Thus, coordinate point 870 defined by bracket groove 862 is the same height 872 as center 874 of stop shoulder bolt 852 when bracket frame 864 abuts bottom surface 850 of height bracket stop 846 as shown in FIG. 16. The predetermined height indicated by displacement data 26 on the plotted drawing 14 is a height 872 of a center 874 of stop shoulder bolt 852 measured from coordinate point 870 defined by bracket groove 862 to flat surface 22. Therefore, a measurement of height 875 of center 874 of stop shoulder bolt 852 is also a measurement of the height 872 of the coordinate point 870 defined by bracket groove 862. Positioning the center 874 of stop shoulder bolt 852 at height 875 is accomplished in the same manner as the measurement of height 752 of coordinate point 748 defined by pipe module 746 as previously discussed.

Once coordinate point 870 defined by bracket groove 862 is positioned at the appropriate height, a bracket 82 is placed in bracket groove 862 and held in place with clamp 854 as shown in FIG. 16. Next, the bracket 82 is tack-welded at location 853 in FIG. 17, to the exhaust pipe 18. Once bracket 82 held within bracket groove 862 has been welded to exhaust pipe 18, handle 858 may be moved to move rubber pad 856 in direction 859 to release bracket 82 from bracket groove 862 in FIG. 17. Then, frame shoulder bolt 866 securing bracket frame 864 to column 154 may be loosened and bracket frame 864 slid downwardly, as indicated by arrow 867 in FIG. 17, to facilitate removal of exhaust pipe 18 from fixtures 16. After a new exhaust pipe 18 has been inserted into fixtures 16, bracket frame 864 may then be slid upwardly until it contacts bottom surface 850 of bracket stop 846 and then be secured to stand 133. By this approach, center or coordinate point 870 defined by bracket groove 862 is returned to the predetermined height 872 and height of coordinate point 870 defined by bracket groove 862 does not need to be measured again until a new height is specified.

Bracket-receiving block is coupled to first side 876 of bracket frame 864 by bolts 878. In alternative embodiments, the bracket-receiving block can be uncoupled from the first side 876 of the bracket frame 864 and re-coupled elsewhere on the bracket frame 864 to create an alternative embodiment of the bracket stand 42.

Figure 18:
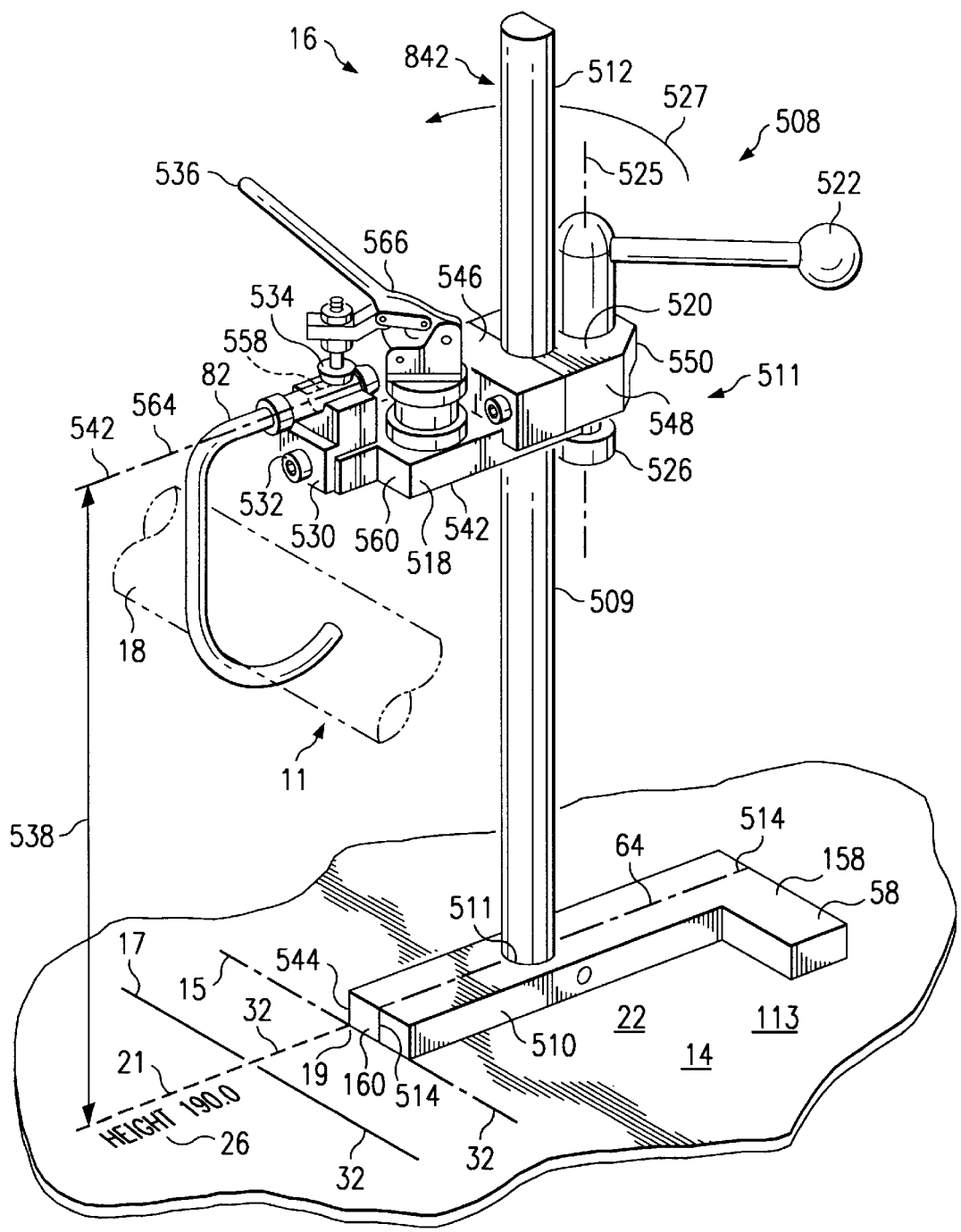
FIG. 18 is a perspective view of yet another bracket fixture showing the bracket fixture including a stand having a D-shaped upright and a slidable and rotatable bracket stand module coupled to the D-shaped upright.
Figure 19:
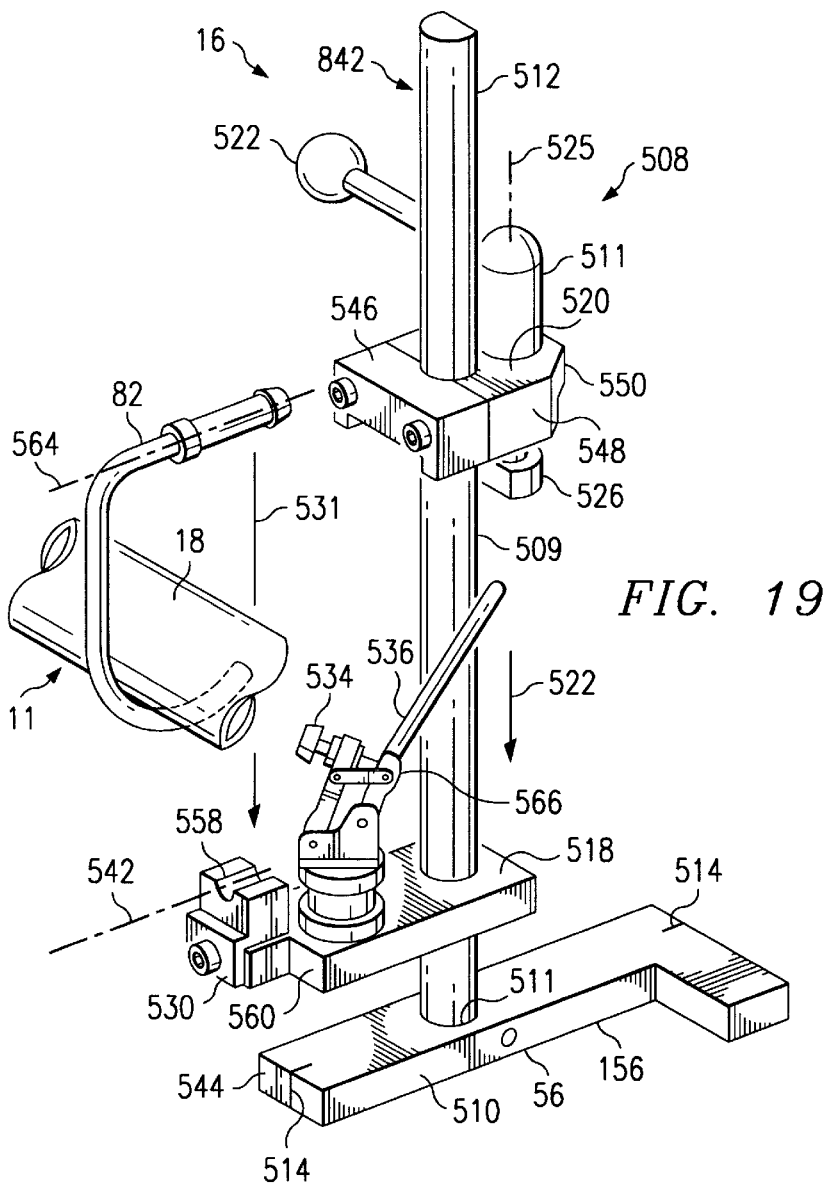
FIG. 19 is a perspective view of the bracket fixture of FIG. 18 showing how the slidable and rotatable bracket module may be slid downwardly away from the exhaust system once the bracket has been tack-welded to the exhaust pipe.
Figure 20:
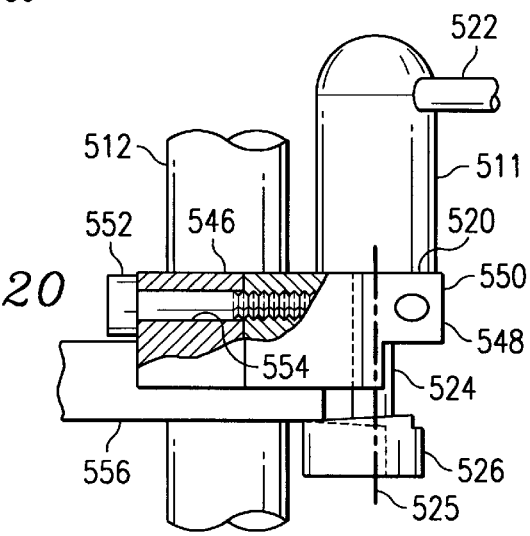
FIG. 20 is a side elevation view, with portions cut away, of the bracket fixture of FIG. 19 showing the bracket module including a locking component and how the locking component secures the slidable and rotatable bracket stand module to the D-shaped upright.

An alternative embodiment of a bracket fixture 508 is shown in FIGS. 18 and 19. Bracket fixture 508 includes a bracket stand 509, a bracket module 511, and an attachment mechanism 550. Bracket stand 509 includes a base 510 and a support column 512. Bracket module 511 includes a height bracket 516 connected to support column 512 and a bracket frame 518. Bracket frame includes a first side 560, a second side 562, and an underside 556.

Base 510 is identical to multi-purpose base 134 except that base 510 includes a single attachment aperture 511 centered on longitudinal axis 62 within which support column 512 is received and is therefore lacking the longitudinal groove 196, lateral channel 206, and attachment holes 220 configured for attaching uprights 153. Base 510 includes alignment indicators 514 and a front edge wall 544.

Alignment indicator 514 in the illustrated embodiment is the edge formed by the long side edge 161 and planar bottom 156.

Attachment mechanism 550 includes a first member 546, a second member 548 having a top surface 520, a shaft 524, a handle 522 attached to shaft 524, and a D-shaped lobe 526. Bracket module 518 further includes a bracket saddle 530 having a bracket groove 558, bolts 532, and a bracket clamp 566 having a rubber pad 534 and a handle 536. The coordinate point 148 defined by bracket fixture 508 is the center 542 of groove 558.

First and second members 546, 548 of attachment mechanism 550 are spaced apart and support column 512 is positioned to lie between each of first and second member 546, 548. Bolts 552 extend through bolt holes 554 in first and second members 546, 548 to couple attachment mechanism 550 to support columns 512.

To support bracket 82 at the appropriate distance and height in relation to exhaust pipe 18, bracket fixture 542 is adjusted in accordance with the plotted drawing 14. First, alignment indicators 514 of base 510 of sensor stand 42 are aligned with alignment indicators 32 of plotted drawing 14. After being mounted to flat surface 22 by tie-down clamps 98, a user adjusts bracket fixture 542 to properly mount bracket 82 to exhaust pipe 18 as shown in FIGS. 1 and 2A. This adjustment is made by moving attachment mechanism 550 to a predetermined height as indicated by plotted drawing 14.

A user loosens bolts 552 to adjust attachment mechanism 550 to the predetermined height. The predetermined height indicated by the plotted drawing 14 is a height 538 of attachment mechanism 550 measured from top surface 520 of second member 548 to flat surface 22. Top surface 520 corresponds to the height of coordinate point 542 defined by bracket groove 558. Therefore, a measurement of height 538 of top surface 520 is also a measurement of the height of the coordinate point 542 defined by bracket groove 558 of bracket saddle 530.

Measurement of height 538 of top surface 520 of second member 548 of attachment mechanism 550 of bracket stand 42 is accomplished in the same manner as the measurement of height 320 of top surface 324 of height bracket 316 of end stand 38 to be discussed hereafter.

Handle 536 rotates shaft 524 and D-shaped lobe 526 in direction 527 about axis 525 from a locked position, shown in FIG. 18, that supports height bracket 516 to an un-locked positioned, shown in FIG. 19, that allows height bracket 516 to be lowered down support column 512 in direction 522. In the locked position, D-shaped lobe 526 overlaps and engages underside 556 of height bracket 516 therefore preventing height bracket 516 from dropping down support column 512. In the un-locked position, D-shaped lobe 526 does not overlap and engage underside 556 of height bracket 516 and does not prevent height bracket 516 from being dropped down support column 512. Therefore, when D-shaped lobe 526 is in the unlocked position, a user can drop height bracket 516 and bracket fixture 518 down support column 512 and away from the exhaust pipe 18 as shown by arrow 531 in FIG. 19.

Bracket clamp 566 and bracket saddle 530 are coupled to height bracket 516. As shown in FIG. 18, bracket 82 is positioned to lie in bracket groove 558 so that center 564 of bracket 82 aligns with coordinate point 542 defined by bracket groove 558. Bracket 82 is coupled by rubber pad 534 to bracket clamp 566. After bracket 82 has been positioned to lie in bracket groove 558, handle 536 is moved to secure rubber pad 534 on bracket 82 and secure bracket 82 to bracket fixture 518 for tack-welding of bracket 82 onto exhaust system 11 as shown in FIG. 18. After bracket 82 has been tack-welded to exhaust system 11, handle 536 is moved to release bracket 82 from contact with rubber pad 534. Then, height bracket 516 can be lowered down support column 512 as previously mentioned and as shown in FIG. 19. Second member 548 of attachment mechanism 550 acts similar to bracket stop 846 of bracket fixture 42 in that second member 548 remains coupled to support column 512 when height bracket 516 is lowered down support column 512 and height bracket 516 can then be returned to a known location adjacent to second member 548.

Bracket saddle 530 is coupled to first side 560 of height bracket 516 by bolts 532. In alternative embodiments, the bracket saddle can be uncoupled from the first side 560 of the height bracket and re-coupled elsewhere on the height bracket to create an alternative embodiment of the bracket stand.

End fixture 38 is shown in FIGS. 21–29. End fixture 38 includes an identical end stand 306 and interchangeable end modules 308. End stand 306 includes a base 310 having alignment indicators 314 and a pair of support columns 312. End module 308 includes a pair of height brackets 316 and a mounting plate 318 defining a center or coordinate point 360. Height bracket 316 includes top surface 324, outside member 328, inside member 330, plurality of bolts 322, angle bolt 344, a plurality of bolt holes 332, angle bolt hole 346, and pivot pin hole 334. Mounting plate 318 includes a pair of pivot pins 336, a pivot plate 338, a support plate 340, and a plate module 342. Pivot plate 338 includes a slot 348 and a T-nut 350.

Figure 21:
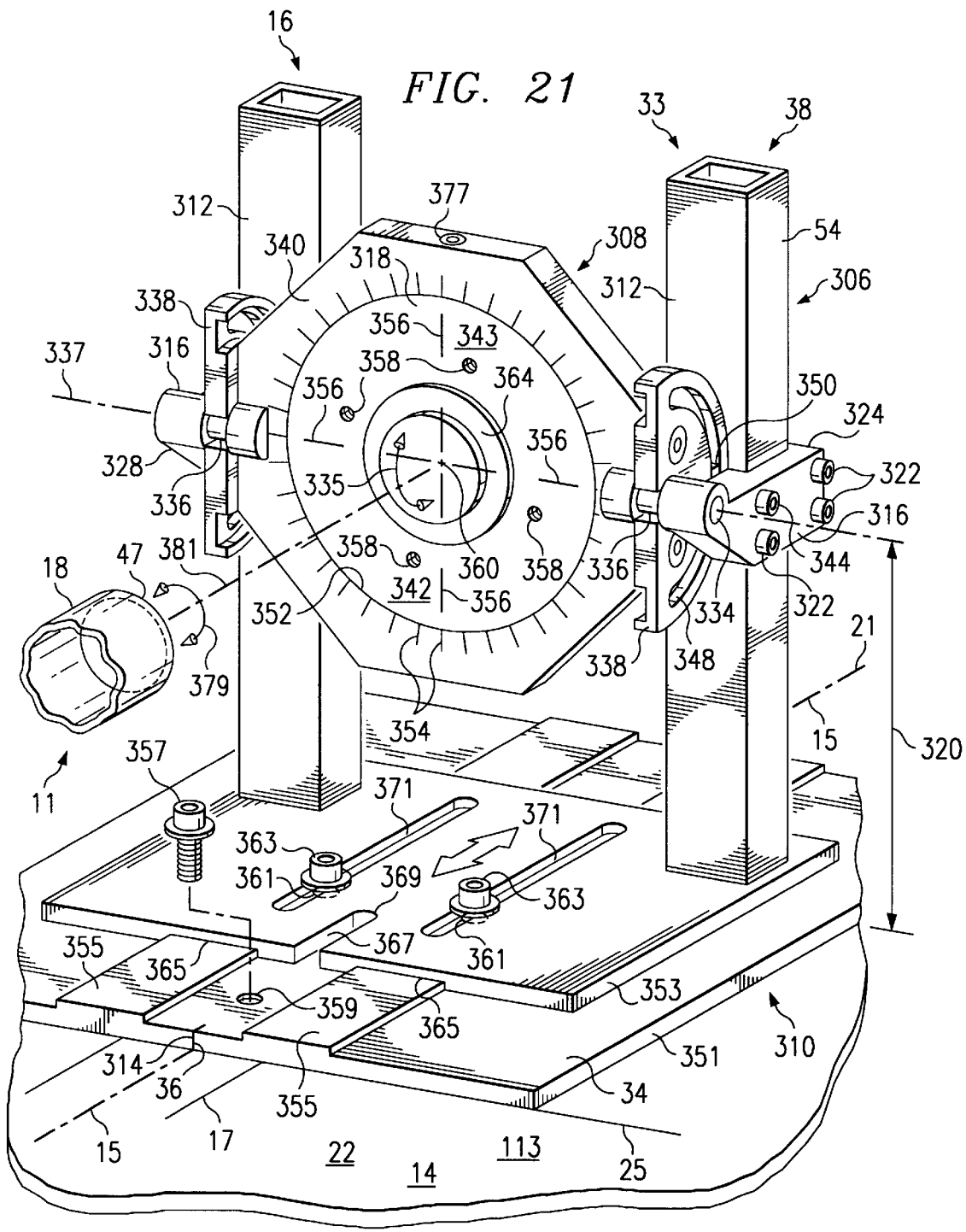
FIG. 21 is a perspective view of an end fixture including a slidable base, a plate module having an inside diameter plug for receiving an exhaust pipe, height brackets, and pivot pins, the base including uprights, the height brackets being on the uprights and coupled to the angle plug plate module by the pivot pins, and the inside diameter plug defines a coordinate point that lies on an axis of rotation of the pivot pins.

Bolts 322 extend through bolt holes 332 in outside and inside members 328, 330 to couple height brackets 316 to support columns 312. Pivot pins 336 of mounting plate 318 are positioned to lie in pivot pin holes 334 of height bracket 316. Thus, mounting plate 318 is pivotably coupled to height brackets 316 to rotate relative to height brackets 316 in direction 335 about an axis 337 as shown in FIG. 21. Slot 348 of pivot plate 338 is arched and T-nut 350 of pivot plate 338 is positioned to lie in slot 348. Angle bolt 344 is positioned to lie within angle bolt hole 346 of height bracket 316 and is threaded into T-nut 350 of pivot plate 338. Support plate 340 of mounting plate 318 includes angle markings 354 and a plate module-receiving aperture 352.

The interchangeable end modules 308 include interchangeable plate modules 342. Plate module 342 is positioned to lie within plate module-receiving aperture 352. In the illustrated embodiments, the plate modules 342 are generally in the shape of a plate. However, the term plate module 342 is defined to cover structure of any size and shape that supports an end 47 of an exhaust system 11.

In the embodiment illustrated in FIG. 21, mounting plate 318 includes a plate module or module 343. Plate module 343 has reference markings 356, flange-mounting holes 358, and a mounting plug 364 as shown in FIG. 21. In other illustrated embodiments, other types of plugs or plate modules may be used with mounting plate 318. These other types of plugs and plate modules are provided for mounting various types of flanges 366 to exhaust system 11 and gauging or checking the alignment of exhaust system 11. As shown in FIGS. 22–29, these other types of plate modules include an angle plate module 368, a sphere plate module 370, and an OD/ID plate module 372.

End fixture 38 is used to simulate the connection made between exhaust pipe 18 of exhaust system 11 and an exhaust connection coming from an engine (not shown) or another exhaust system (not shown). To simulate the exhaust connection, the end stand 38 is adjusted in accordance with the plotted drawing 14. First, alignment marks 314 of base 310 of end fixture 38 are aligned with alignment indicators 32 of plotted drawing 14. Typically the end 47 of exhaust pipe 18 is indicated on the drawing by end line 25 perpendicular to projected centerline 15. Projected centerline 15 is extended beyond end line 25 and the extension of projected centerline 15 serves as an alignment line 21 for the end fixture 38. After end fixture is mounted to flat surface 22 by tie-down clamps 98, a user adjusts end module 38 to simulate the height and angle of the exhaust connection. These adjustments are made by moving height brackets 316 to a predetermined height 320 and mounting plate 318 to a predetermined angle 362 (FIG. 31) as indicated by plotted drawing 14.

The displacement data 26 and angular data 27 associated with end line 25 on drawing 14 includes predetermined height 320 of height bracket 316 and predetermined angle 362 of mounting plate 318. After reading drawing 14, a user loosens bolts 322 to adjust height brackets 316 to the predetermined height 320. The predetermined height 320 of height brackets 60 is measured from top surface 324 of height bracket 316 to flat surface 22 of table 10. In alternative embodiments, the height could be measured from the drawing or any other surface to any reference surface or point of the end stand.

Top surface 324 of height bracket 316 is positioned to lie at the same height as center or coordinate point 360 defined by mounting plate 318. Thus, a measurement of height 320 of top surface 324 is also a measurement of the height of the coordinate point 360 defined by mounting plate 318. In end module 308, center 360 of mounting plate 318 is coordinate point 148.

Figure 31:
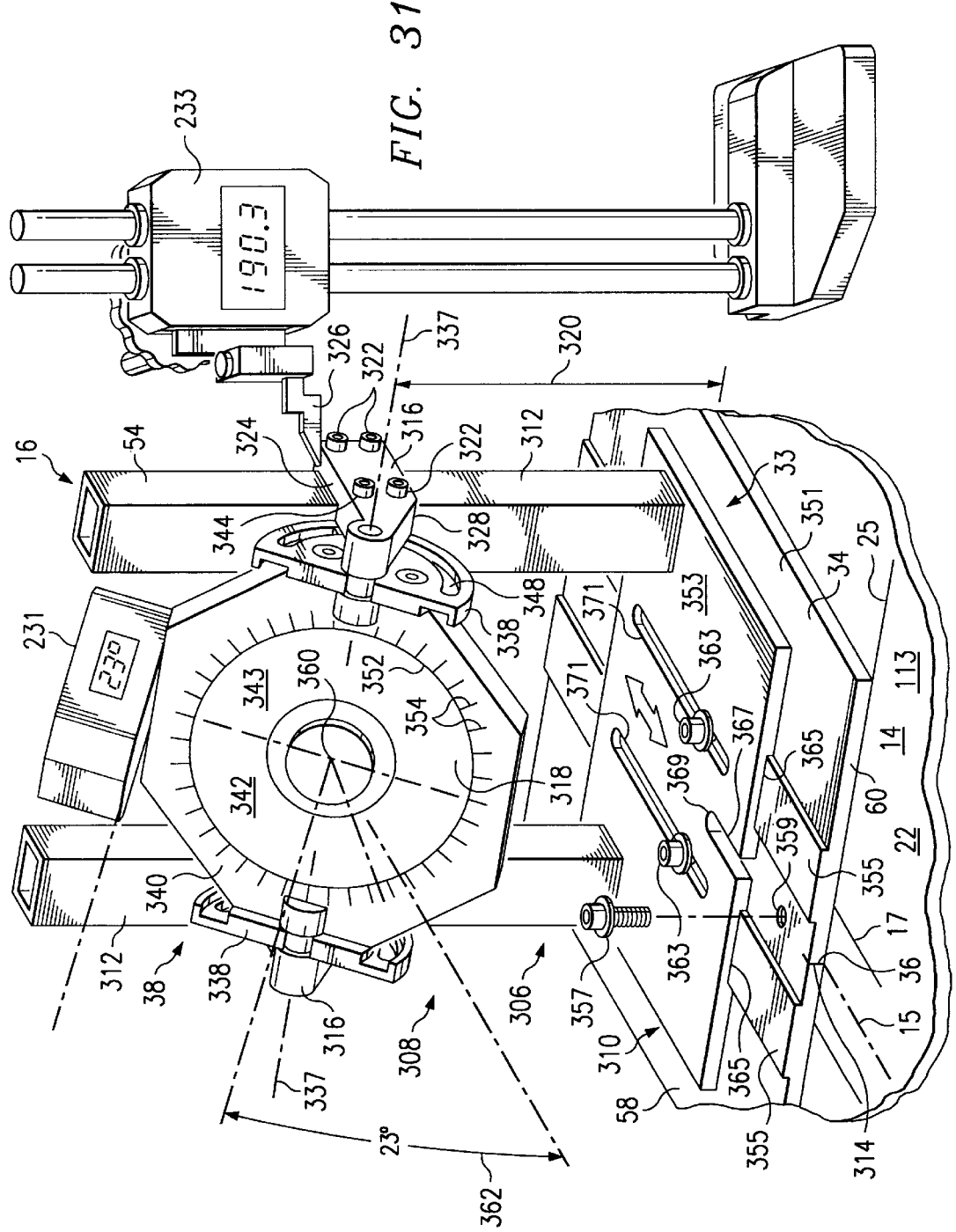
FIG. 31 is a perspective view of an end fixture showing the digital height gauge having an alternative attachment resting on a surface of the end fixture to measure the height of the coordinate point defined by the end fixture and a protractor measuring the angular position of the end fixture.

A digital readout height gauge 233 is attached to height bracket 316 via a gauge arm 326 to top surface 324 of height bracket 316 as shown, for example, in FIG. 31. This measurement of height 320 is compared to the predetermined height and height bracket 316 is raised or lowered so that height 320 significantly matches the predetermined height. After setting height 320, bolts 322 are tightened to secure height brackets 316 at height 320.

As previously mentioned, mounting plate 318 is pivotably connected to height brackets 316 by pivot pins 336 so that mounting plate 318 can be rotated to the angle 362 provided by displacement data 26. By loosening angle bolt 344 from T-nut 350, mounting plate 318 is able to pivot about axis 337 of pivot pins 336 as T-nut 350 slides in slot 348. While mounting plate 318 is free to pivot, a digital protractor 231 can be placed on mounting plate 318 to measure an angle 362 between the mounting plate 318 and top surface 22 of wheeled table 12 as shown in FIG. 31. In alternative embodiments, the angle 362 may be between surfaces other than the mounting plate and top surface of wheeled table 12. Once angle 362 of mounting plate 318 substantially matches the predetermined angle 362, angle bolt 344 is tightened to lock T-nut 350 and mounting plate 318 at the predetermined angle 362. Thus, a user has simulated the positioning of an exhaust connection from an engine for the purpose of mounting exhaust pipe 18.

Base 310 of end stand 306 includes a surface-engaging plate 351 and a sliding plate 353 attached for movement relative to surface-engaging plate 351. Surface-engaging plate 351 includes a front wall 60, a rear wall 62, followers 355 extending between front wall 60 and rear wall 62, a stop bolt 357, a stop bolt hole 359, a plurality of attachment holes 361, and a plurality of attachment bolts 363. Sliding plate 353 includes channels 365 positioned to receive followers 355 of surface-engaging plate 351, a slide slot 367 having a maximum travel end 369 arranged to stop forward movement of sliding plate 353 relative to surface-engaging plate 351, and a plurality of slots 371 for receiving plurality attachment bolts 363 which are threaded into the plurality of attachment holes 361 on surface-engaging plate 351. Stop bolt 357 is received in stop bolt hole 357 on surface-engaging plate 351 and slides in slide slot 367 on sliding plate 353. Slide slot 367, stop bolt 357, attachment bolts 363, slots 371, channels 365, and followers 355 permit sliding plate 353 to move relative to surface-engaging plate 351 in direction 349 when attachment bolts 363 are loosened.

Each mounting plate 318 includes a circumferentially-extending groove 375 into which a plurality of set screws 377 extending through support plate 340 are received to secure mounting plate 318 within support plate 340 as shown in FIG. 4. When set screws 377 are slightly loosened, mounting plate 318 is free to rotate in direction 379 about center axis 381 relative to support plate 340. During rotation of mounting plate 318 within support plate 340, set screws 377 pass through circumferentially-extending groove 375.

Figure 22:
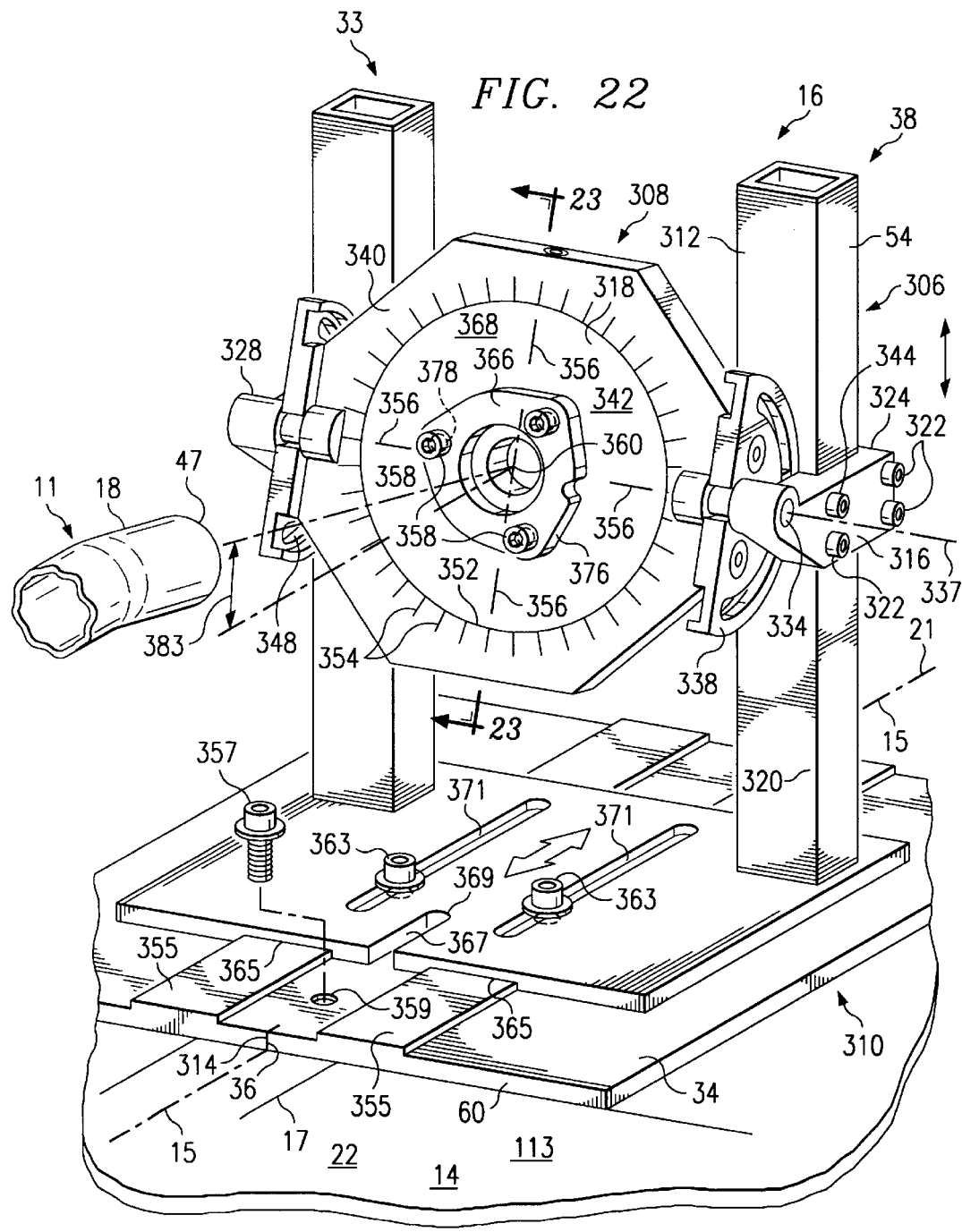
FIG. 22 is a perspective view of the end fixture using a different plate module and an outside diameter plate or flange coupled to the plate module.
Figure 23:
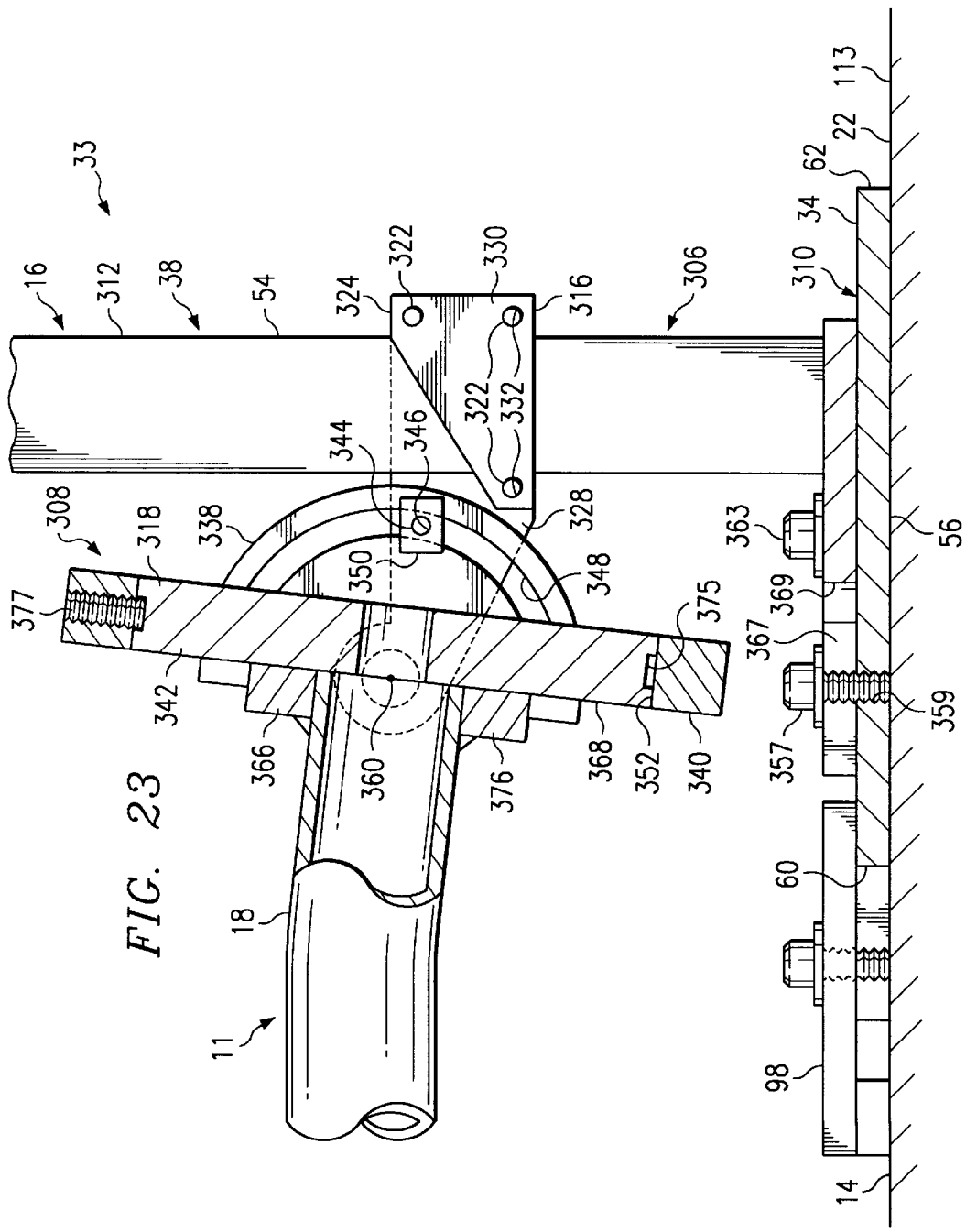
FIG. 23 is a sectional view, taken along line 23—23 of FIG. 22, of the end fixture.
Figure 24:
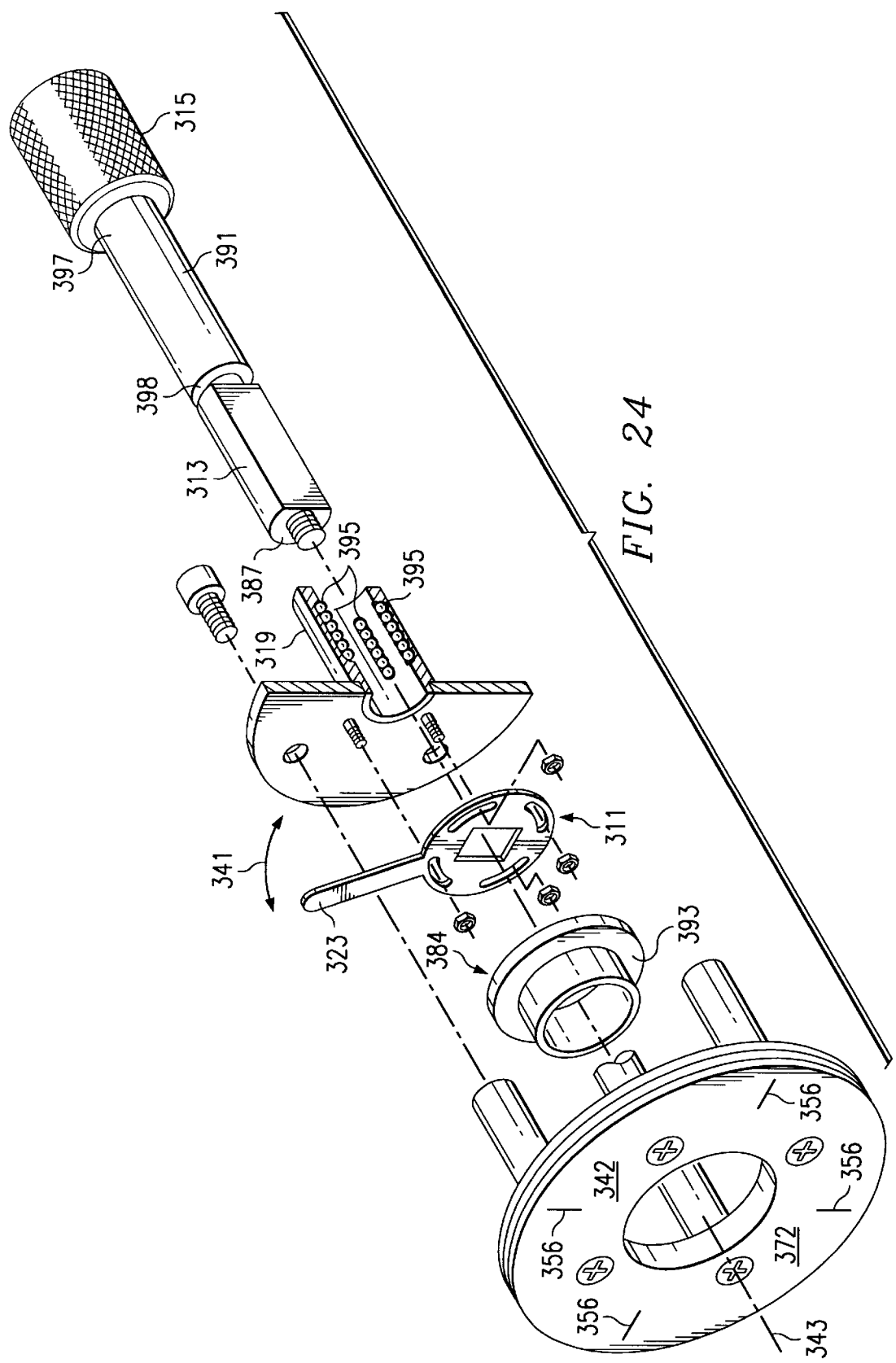
FIG. 24 is an exploded view of a plate module including an actuator, a plug, and a rotatable key, the actuator being formed to include a groove sized to receive the rotatable key.
Figure 25:
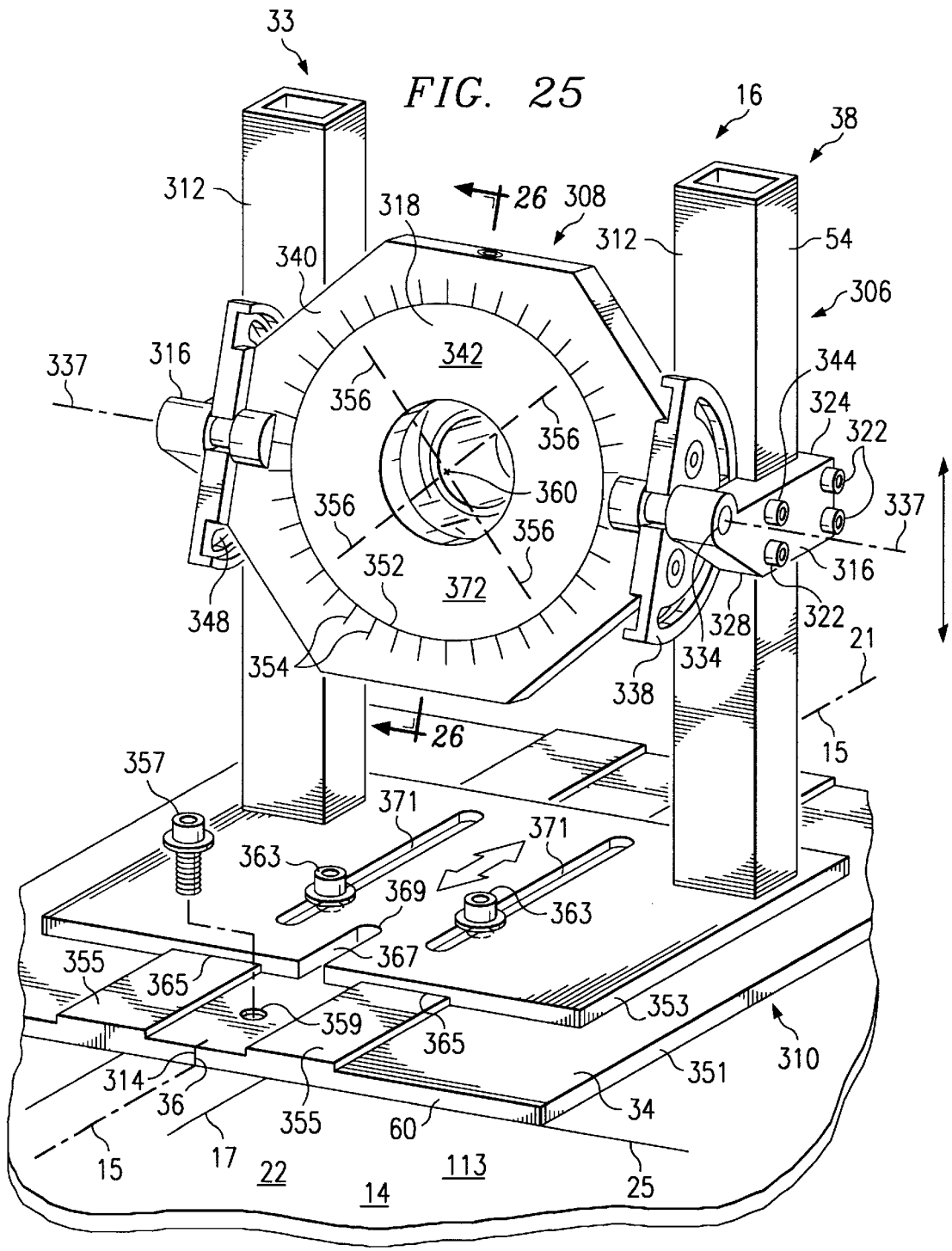
FIG. 25 is a perspective view of the end fixture including the plate module of FIG. 24.

Angle plate module 368 includes reference markings 356 spaced apart by ninety degrees, flange-mounting holes 358, and a pipe mount 374 as shown in FIGS. 22 and 23. Angle plate module 368 is used to position a flange 376 at a specified angle 383 in relation to exhaust pipe 18 as shown, for example, in FIG. 23. The flange 376 is coupled to the angle plate module 368 by bolts 378 extending through flange-mounting holes 358. To achieve the proper angular alignment of flange 376 to exhaust pipe 18, angle plate module 368 is turned until reference markings 356 align with the appropriate angle marking 354 as specified by plotted drawing 14. Thus, mounting plate 318 of end stand 38 is capable of positioning a flange 376 at a specified angle relative to exhaust pipe 18.

Figure 28:
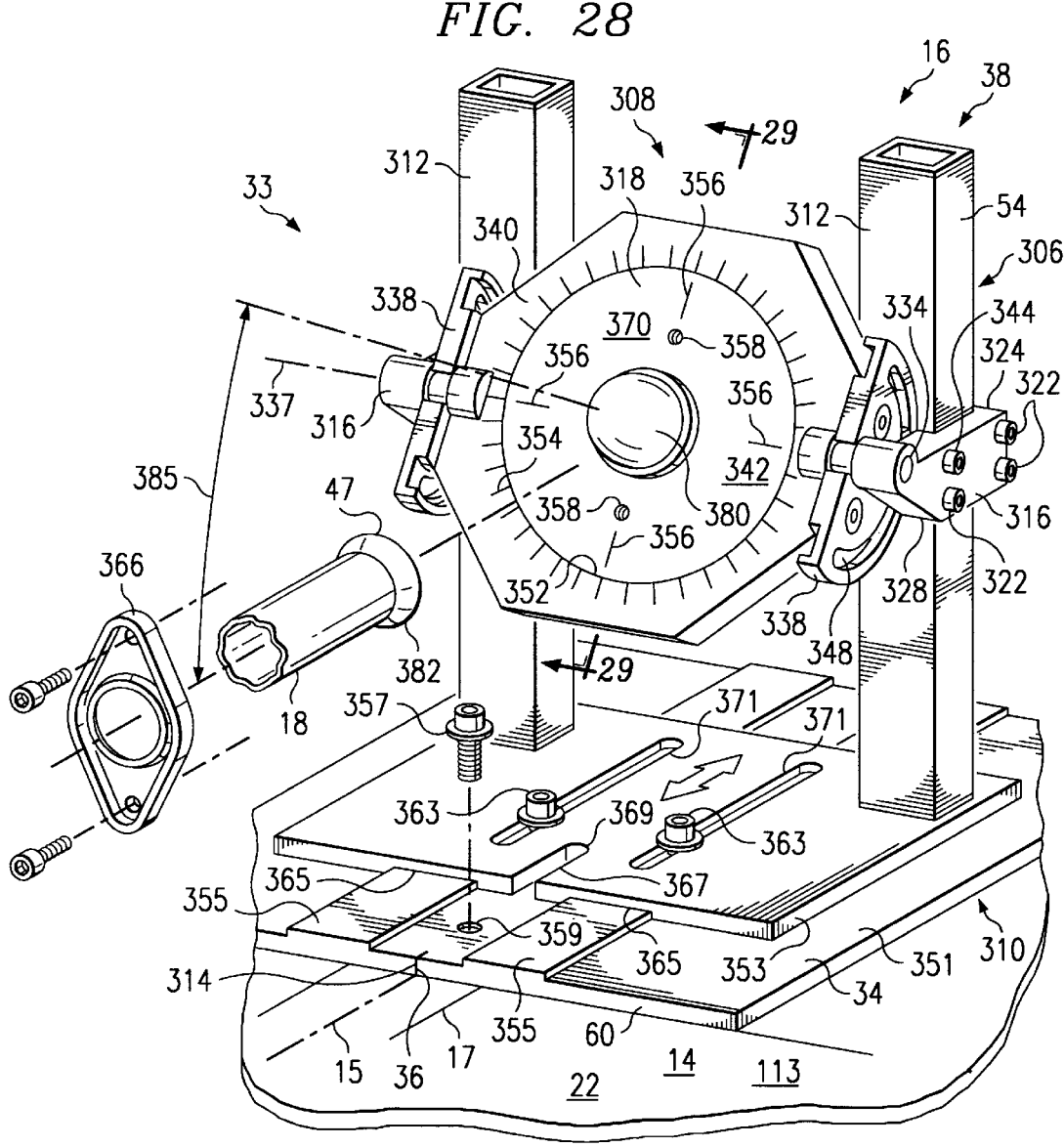
FIG. 28 is a perspective view of the end fixture including another plate module including a sphere plug for receiving a flared end of an exhaust pipe and a flange.
Figure 29:
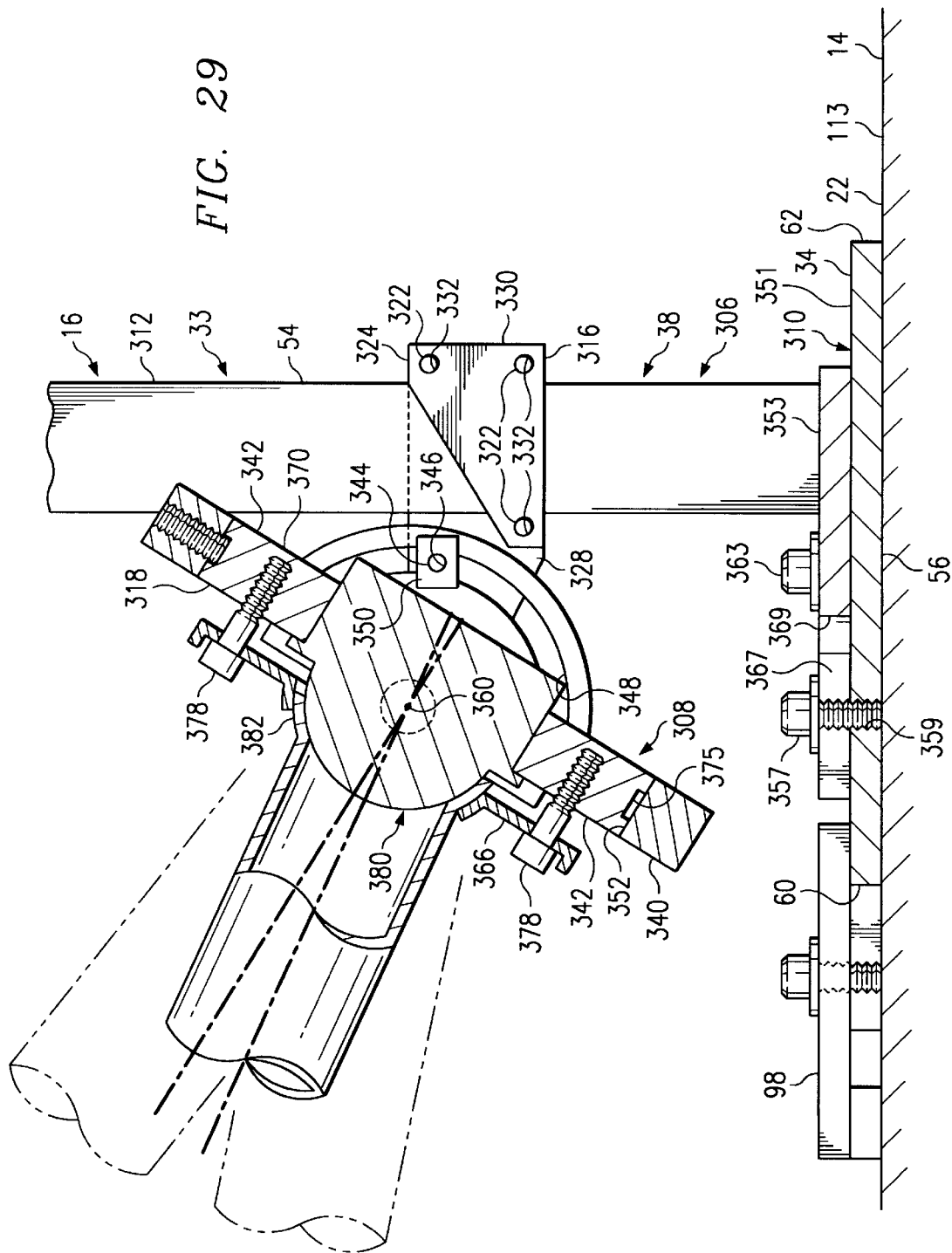
FIG. 29 is a sectional view, taken along line 29—29 of FIG. 28, of the end fixture of FIG. 28 showing the flared end of the exhaust pipe connected to the fixture by bolts extending through the flange into the plate module, deviations in the centerline of the exhaust pipe are accommodated for by the sphere plug as shown by the exhaust pipe in solid and phantom lines.

Sphere plate module 370 includes reference markings 356 spaced apart at ninety degrees, flange-mounting holes 358, and a sphere mount 380. Sphere mount 380 is shaped as a half sphere as shown in FIGS. 28 and 29. Sphere plate module 370 is used to position flanges 366 at a specified angle 385 in relation to exhaust pipes 18 including a flared end 382 as shown, for example, in FIGS. 28 and 29. Similar to plate module 342, sphere plate module 370 includes a circumferentially-extending groove 375 within which set screws 377 are received. The flange 366 is coupled to the sphere plate module 370 by a set of bolts 378. To achieve the proper angular alignment of flange 366 to exhaust pipe 18, sphere plate module 370 is turned until reference markings 356 align with the appropriate angle marking 354 as specified by the plotted drawing 14. Thus, the mounting plate 318 of end stand 38 is capable of positioning a flange 366 at a specified angle 385 relative to the flared end 382 of exhaust pipe 18.

Sphere plate module 370 is used to simulate connection of an exhaust system 11 to a flange 366 having studs (not shown) such as are often found on exhaust manifolds (not shown). A heat resistant gasket or donut gasket (not shown) is typically inserted between the exhaust manifold and the end 47 of exhaust system so that tightening of the flange 366 on the exhaust system 11 will slightly compress the gasket to seal any possible exhaust leaks. Thus, alignment of end 47 of exhaust system 11 is not as critical when sphere plate module 370 is used as compared to other mounting plates 318 used in the end fixture 38.

OD/ID plate module 372 includes reference markings 356 spaced apart at ninety degrees, a plug mount 384 having an inner diameter 386, an outer diameter 388, and an actuator 391 as shown, for example in FIGS. 24–27. OD/ID plate modules 372 are used to support end 47 of exhaust pipe 18. Actuator 391 has a plug-holding end 387 for receipt of one of an inside diameter plug mount 393 for insertion into an end 47 of an exhaust system or an outside diameter plug mount (not shown) into which the end 47 of an exhaust system 11 is inserted. Thus OD/ID plate module 372 is used to check one of inner and outer diameters 392, 394 of exhaust 18 pipe at end 47. Plug mount 384 fits within the end 47 of exhaust pipe 18 unless the end 47 is out of tolerance. If the inner diameter 392 of exhaust pipe 18 is too small, plug mount 384 will not fit into exhaust 18 and exhaust pipe 18 must be corrected to fit within the given tolerance chosen. In an alternative embodiment, the plug mount may be an outer diameter plug mount and can be adapted to fit over the end 47 of the exhaust pipe 18 so that the plug mount will slide over the end 47 of the exhaust pipe 18 unless the outer diameter 394 of the exhaust pipe 18 is too large.

Plug mount 384, if received in exhaust pipe 18, is centered on coordinate point 360 defined by mounting plate 318 which is centered on center line 15 of plotted drawing 14. Therefore, if the exhaust pipe 18 does not fit on plug mount 384 because it is off center of center line 15, the user can gauge the error and correct the error in the exhaust pipe 18.

Exhaust pipe 18 includes a rotational orientation about the centerline 291 of the exhaust pipe 18 known as twist. A notch 389 may be placed in end 48 of exhaust pipe 18 to determine if the exhaust pipe 18 is in the proper rotational orientation. Plug mount 384 is equipped with reference pin 390. If the rotational orientation of exhaust pipe 18 is proper, the reference pin 390 of plug mount 384 should fit into the notch 389. Therefore, if pin 390 of plug mount 384 does not fit into the notch 389, the user knows that the rotational orientation of the exhaust pipe 18 in relation to the end fixture 38 is not correct. Thus, the mounting plates 318 can be used to mount flanges 366, center the exhaust pipe 18, gauge the inside and outside diameter 392, 394 of exhaust pipe 18, and gauge the rotational orientation of exhaust pipe 18.

Figure 26:
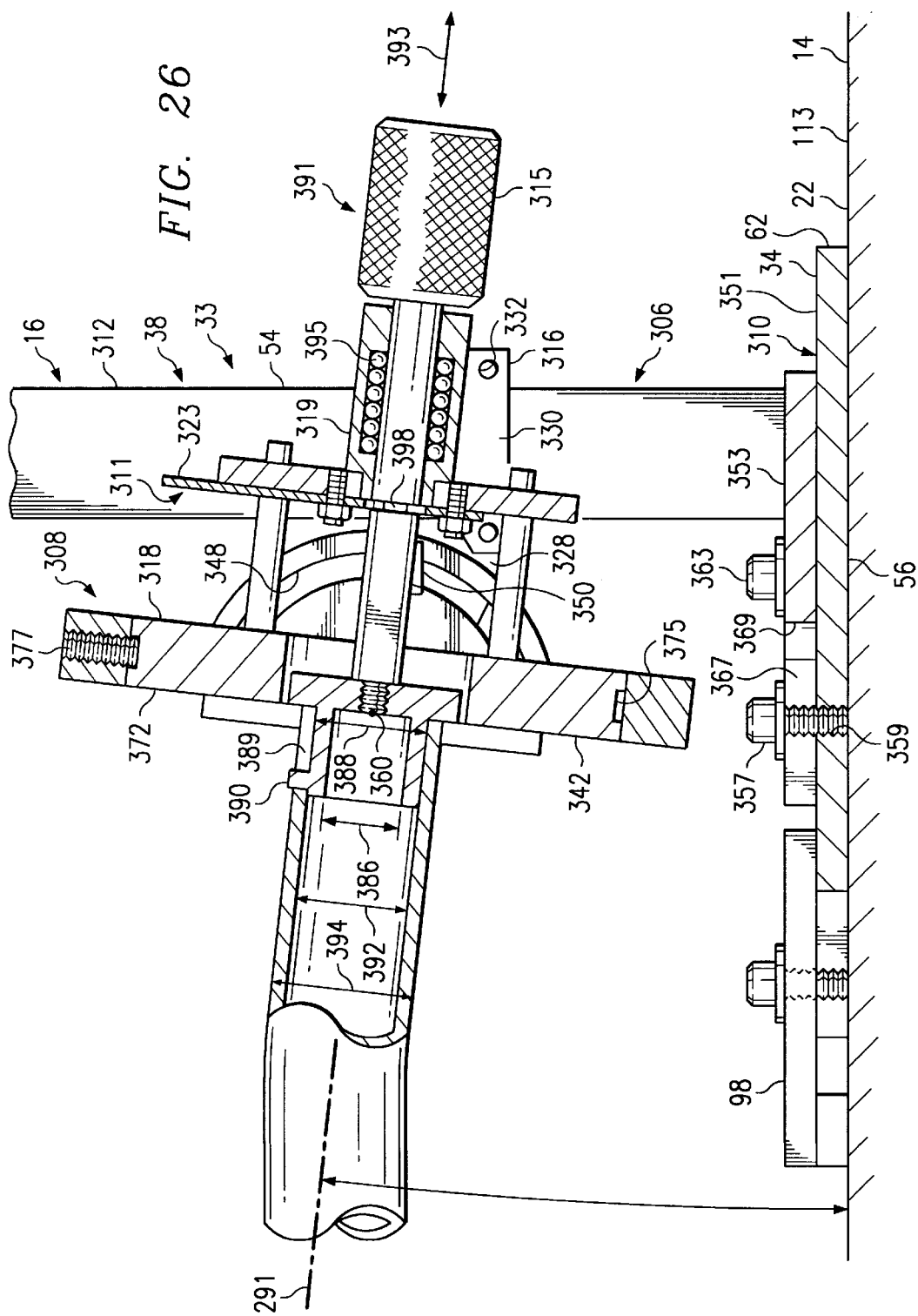
FIG. 26 is a sectional view, taken along line 26—26 of FIG. 25, of the end fixture of FIG. 25 showing the plug inserted into the exhaust pipe and the key rotated to fit in the groove of the actuator to lock the actuator in position to hold the end of the pipe.
Figure 27:
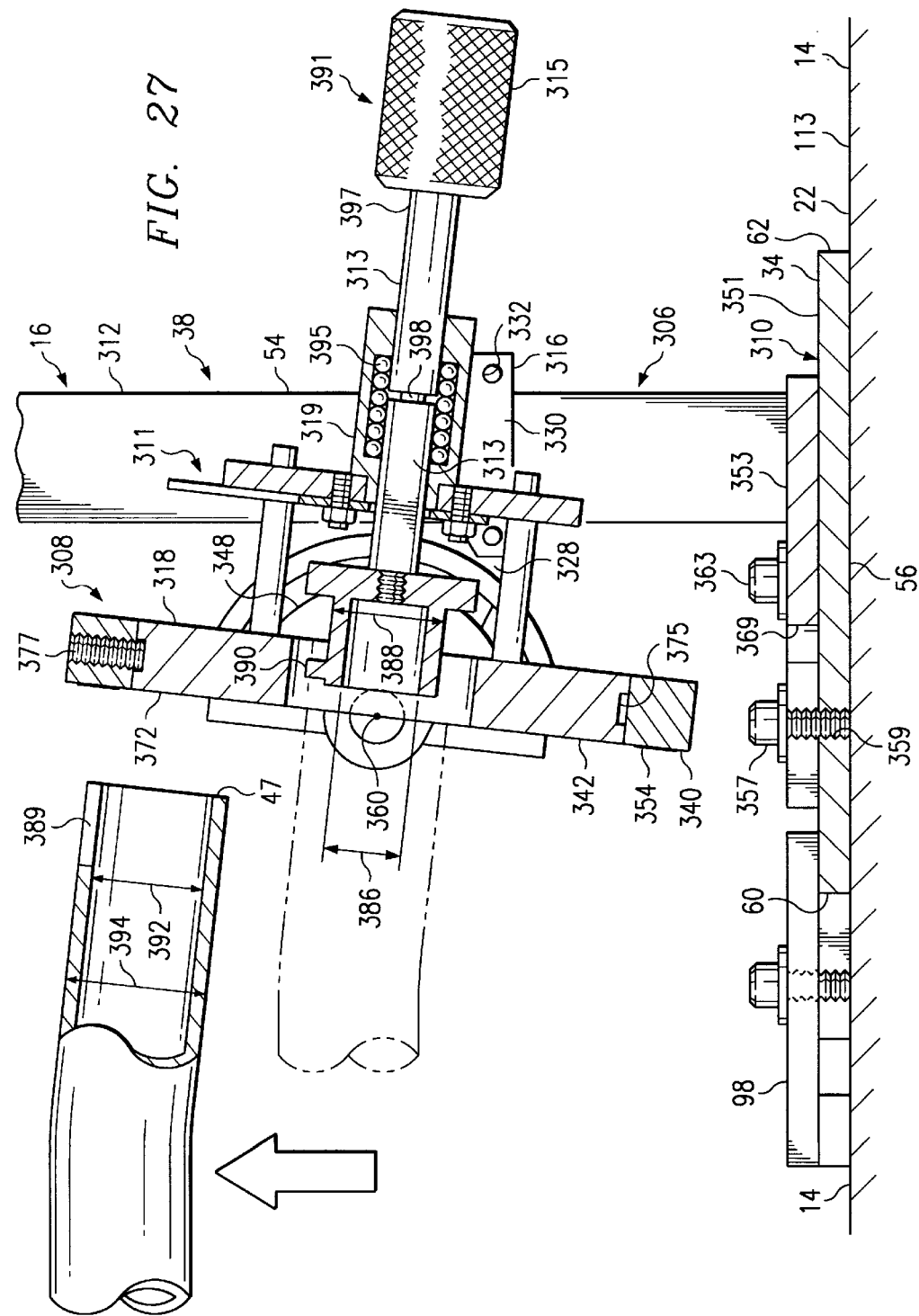
FIG. 27 is a sectional view similar to FIG. 26 showing the end fixture of FIG. 26 with the key rotated out of the groove of the actuator and the actuator retracted away from the exhaust pipe.

To aid in the insertion and removal of plug 384 from exhaust pipe 18, OD/ID plate module 372 includes an actuator 391 so that plug mount 384 can be actuated toward and away from end 48 of exhaust pipe 18 as shown by arrow 393 and, for example, in FIGS. 26–27. Actuator 391 allows plug mount 384 to be advanced into and withdrawn from exhaust pipe 18. By allowing a user to remove plug mount 384 from exhaust pipes 18, a user can remove a completed exhaust system 11 without having to remove end fixtures 38 or plug mount 384.

Actuator 391 includes a locking mechanism 311, a shaft 313 having an axis 343, a handle 315, bearings 395, and a bearing support 319. OD/ID plate module 384 further includes a plug mount-receiving aperture 396. Shaft 313 includes a plug-holding end 387 coupled to plug mount 384 and a second end 397 coupled to handle 315. Shaft 313 is D-shaped, rotates in and actuates along the bearings 395, and includes a groove 398 that cooperates with the locking mechanism 311. The bearings 395 support shaft 313 and are supported by bearing support 319. By actuating plug mount 384 with shaft 313, plug mount 384 can be withdrawn from exhaust pipe 18 and exhaust pipe 18 can be easily removed from end stand 38.

Locking mechanism 311 of actuator 391 includes a set of bolts 321 and a locking key 323. Locking key 323 include a square aperture 325 and slots 327 as shown, for example, in FIG. 24. Locking key 323 rotates in direction 341 about axis 343 from a locked position as shown in FIG. 26 to an unlocked position as shown in FIG. 27. In the locked position, locking key 323 fills groove 398 of shaft 313 so that shaft 313 is unable to move plug mount 384. In the unlocked position, locking key 323 does not fill groove 398 so that shaft 313 can move plug mount 384. Shaft 313 is D-shaped and locking key 323 fills only one portion of groove 398. In an alternative embodiment, shaft 313 is square shaped so that locking key 323 fills four portions of groove 398 for a more secure fit.

By having fixtures 16 which can be attached and removed from a movable surface 22, the fixtures 16 can be reconfigured as needed to gauge and support various exhaust system components and exhaust system configurations so that dedicated, purpose and component specific gages need not be constructed. When the specific configuration of the fixtures 16 is no longer needed, the fixtures 16 may be disassembled and stored for subsequent use.

Although this invention has been described in detail with reference to certain embodiments, variations and modifications exist within the scope and spirit of the invention as described and as defined in the following claims.

What is claimed is:

1. A fixture for interacting with an exhaust system having exhaust pipes and mufflers and an image of the exhaust system, the image having location indicia locating the fixture on the image, displacement data associated with the location indicia indicates an alignment point in space above the image, the fixture comprising at least two stands adapted to lie in a selected positions relative to the image, an alignment mark on the stands, the alignment mark being adapted to align the stands with the location indicia on the image, and at least two modules a plurality of holders configured differently from one another to be attached to a module, each holder defining a coordinate point that moves relative to the stand and image in response to movement of the module relative to the stand, the plurality of holders including at least one pipe holder configured to receive the exhaust pipe therein to position a central axis of the exhaust pipe at the coordinate point and a muffler holder configured to cooperate with another stand and another module to receive a muffler, and wherein the modules are configured to be coupled to the stand for movement relative to the stand to position the coordinate point of an attached holder at the alignment point in space above the image so that the module is moved to assume a selected position relative to the stand.

2. The fixture of claim 1, wherein the stand includes a base and an upright coupled to the base, the module being attached to the upright for movement relative to the base.

3. The fixture of claim 2, further comprising a coupler, the upright including a slot, one of the coupler and module extending through the slot to couple the coupler to the upright and the module, and the coupler and module being movable within the slot relative to the upright.

4. The fixture of claim 2, further comprising a coupler, the upright being formed to include an aperture, and one of the coupler and module extending through the aperture along a coupler axis to couple the upright and module and permit the module to pivot about the coupler axis.

5. The fixture of claim 2, wherein the module is pivotable relative to the upright.

6. The fixture of claim 2, wherein the upright includes spaced-apart first and second ends and a longitudinal axis extending between the first and second ends and the module is movable relative to the upright along the longitudinal axis.

7. The fixture of claim 6, wherein the module is mounted to the upright to pivot about an axis of rotation and the coordinate point lies on the axis of rotation.

8. The fixture of claim 7, wherein the axis of rotation of the module is substantially perpendicular to the longitudinal axis of the upright.

9. The fixture of claim 1, wherein the stand includes a front edge and a rear edge and the alignment mark on the stand includes a first alignment mark in the proximity of the front edge and a second alignment mark in the proximity of the rear edge.

10. The fixture of claim 9, wherein the first alignment mark is on the front edge.

11. The fixture of claim 9, wherein the second alignment mark is on the rear edge.

12. The fixture of claim 9, wherein the stand includes a longitudinal axis extending between the front edge of the stand and the rear edge of the stand and the first and second alignment marks are on the longitudinal axis at the front and rear edges, respectively.

13. The fixture of claim 12, further comprising an upright attached to the stand, the module being coupled to the upright for movement relative to the stand, the upright having spaced-apart first and second ends and a longitudinal axis extending between the first and second ends, and the longitudinal axis of the upright intersects the longitudinal axis of the stand.

14. The fixture of claim 13, wherein the stand includes a substantially planar bottom surface, the upright includes a substantially planar front surface, the front surface of the upright is substantially parallel to the longitudinal axis of the upright, and the bottom surface of the stand is substantially perpendicular to the longitudinal axis of the upright.

15. The fixture of claim 14, wherein the substantially planar front surface of the upright is displaced a first distance in a direction substantially parallel to the longitudinal axis of the stand from the front edge of the stand and the coordinate point is displaced by the first distance in a direction substantially parallel to the longitudinal axis of the stand from the substantially planar front surface of the upright.

16. The fixture of claim 1, wherein the stand includes a front edge, a rear edge, and a longitudinal axis extending between the front and rear edges and the alignment mark on the stand includes an alignment mark on the front edge.

17. The fixture of claim 16, wherein the coordinate point is displaced vertically above the alignment mark and lies on a line that is perpendicular to the longitudinal axis of the stand.

18. The fixture of claim 1, wherein the image is a drawing.

19. A muffler fixture for supporting a muffler of an exhaust system, the muffler fixture comprising first, second, third, and fourth stands, first, second, third, and fourth muffler modules, the first muffler module being coupled to the first stand for movement relative to the first stand, the second muffler module being coupled to the second stand for movement relative to the second stand, the third muffler module being coupled to the third stand for movement relative to the third stand, and the fourth muffler module being coupled to the fourth stand for movement relative to the fourth stand, and a muffler support coupled to the first, second, third, and fourth muffler modules.

20. The muffler fixture of claim 19, wherein the muffler support includes a curved bar.

21. The muffler fixture of claim 20, wherein the curved bar includes an aperture, the muffler fixture further comprises an adjustment member extending through the aperture of the curved bar, and the adjustment member includes a muffler-engaging end that is spaced apart from the curved bar.

22. The muffler fixture of claim 19, further comprising an adjustment member coupled to the muffler support, the adjustment member including a muffler-engaging end that is spaced apart from the muffler support.

23. The muffler fixture of claim 19, wherein the muffler support includes a first muffler support coupled to the first and second stands and a second muffler support coupled to the third and fourth muffler stands.

24. A pipe fixture for supporting exhaust system components, the pipe fixture comprising a stand and a module coupled to the stand and movable relative to the stand, the module including a frame and an insert, the frame including an insert-receiving groove, the insert including a frame-engaging portion and an exhaust system-engaging portion that is adapted to engage an exhaust system, and the insert being positioned to lie in the insert-receiving groove.

25. The pipe fixture of claim 24, wherein the frame is formed to include a second insert-receiving groove and the module includes a second insert positioned to lie in the second insert-receiving groove.

26. A pipe fixture for supporting an exhaust system, the pipe fixture comprising a stand and a module coupled to the stand and movable relative to the stand, the module including a frame and a plurality of inserts, one of the plurality of inserts is coupled to the frame, the plurality of inserts includes an alignment insert that is adapted to position the module relative to the base and an exhaust system support insert that is adapted to support an exhaust system.

27. The pipe fixture of claim 26, wherein the alignment insert includes an alignment point that specifies the orientation of the module relative to the base.

28. The pipe fixture of claim 27, wherein the stand includes a base and an upright coupled to the base, the pipe fixture further comprises a coupler configured to couple the upright and the frame of the module, the frame and coupler are rotatable about an axis of rotation relative to the upright, and the axis of rotation extends through the alignment point of the alignment insert.

29. The pipe fixture of claim 27, wherein the frame is rotatable relative to the stand about an axis of rotation and the axis of rotation extends through the coordinate point.

30. The pipe fixture of claim 26, wherein the exhaust system support insert includes a frame-engaging portion that engages the frame and an exhaust system-engaging portion adapted to support an exhaust system.

31. The pipe fixture of claim 30, wherein the exhaust system-engaging portion of the exhaust system support insert includes an edge defining an opening.

32. The pipe fixture of claim 31, wherein the opening defined by the edge has a first width and the plurality of inserts includes a second exhaust system support insert having an exhaust system-engaging portion that includes an edge defining an opening having a second width that is different than the first width.

33. A bracket fixture for supporting an exhaust system bracket adjacent to an exhaust system, the bracket stand comprising a stand, the stand having a base, an upright coupled to the base, and a stop member movably coupled to the upright, the base having a longitudinal axis, and a module coupled to the upright for movement relative to the upright, the module including a clamp coupled to the upright for movement relative to the upright, the clamp being configured to support an exhaust system bracket and move between a first position adjacent the stop member and a second position adjacent to the base, the clamp defining a coordinate point, the stop member including an alignment mark, and the alignment mark of the stop member and coordinate point defined by the clamp lie on a line that extends parallel to the longitudinal axis of the base.

34. An end fixture for interacting with an end of an exhaust system and a flange of an exhaust system, the end fixture comprising a stand and an end module pivotally coupled to the stand, the end module including a mounting plate, a plate module coupled to the mounting plate, and a coupler, the plate module is adapted to engage an end of an exhaust system, and the coupler is coupled to one of the mounting plate and plate module and adapted to engage a flange of an exhaust system to fix the position of the flange relative to the end of the exhaust system.

35. The end fixture of claim 34, wherein the mounting plate is formed to include an aperture and the coupler is threaded into the aperture formed in the mounting plate.

36. An end fixture for interacting with an end of an exhaust system, the end fixture comprising a stand and a plurality of end modules configured to be pivotally coupled to the stand each of the plurality of end modules having a differently configured plug, one of the plurality of end modules being coupled to the stand, the plurality of end modules including a support plate and a plug connected to the support plate and adapted to engage an end of an exhaust system, the support plate being movable relative to the stand to position to one of the plurality of plugs in the proper orientation relative to the end of the exhaust system.

37. A fixture for interacting with an exhaust system and an image of the exhaust system, the image having location indicia locating the fixture on the image, displacement data associated with the location indicia indicates an alignment point in space above the image, the fixture comprising a stand adapted to lie in a selected position relative to the image, the stand including a front edge and a rear edge and a first alignment mark in the proximity of the front edge and a second alignment mark in the proximity of the rear edge, the first and second alignment marks being adapted to align the stand with the location indicia on the image, and a module defining a coordinate point that moves relative to the stand and image in response to movement of the module relative to the stand, the module being coupled to the stand for movement relative to the stand to position the coordinate point of the module at the alignment point in space above the image so that the module is moved to assume a selected position relative to the stand.

38. The fixture of claim 37, wherein the first alignment mark is on the front edge.

39. The fixture of claim 37, wherein the second alignment mark is on the rear edge.

40. The fixture of claim 37, wherein the stand includes a longitudinal axis extending between the front edge of the stand and the rear edge of the stand and the first and second alignment marks are on the longitudinal axis at the front and rear edges, respectively.

41. The fixture of claim 40, further comprising an upright attached to the stand, the module being coupled to the upright for movement relative to the stand, the upright having spaced-apart first and second ends and a longitudinal axis extending between the first and second ends, and the longitudinal axis of the upright intersects the longitudinal axis of the stand.

42. The fixture of claim 41, wherein the stand includes a substantially planar bottom surface, the upright includes a substantially planar front surface, the front surface of the upright is substantially parallel to the longitudinal axis of the upright, and the bottom surface of the stand is substantially perpendicular to the longitudinal axis of the upright.

43. The fixture of claim 42, wherein the substantially planar front surface of the upright is displaced a first distance in a direction substantially parallel to the longitudinal axis of the stand from the front edge of the stand and the coordinate point is displaced by the first distance in a direction substantially parallel to the longitudinal axis of the stand from the substantially planar front surface of the upright.

* * * * *